(12) United States Patent
Mi

(10) Patent No.: US 7,301,592 B2
(45) Date of Patent: Nov. 27, 2007

(54) DARK STATE LIGHT RECYCLING FILM AND DISPLAY

(75) Inventor: Xiang-Dong Mi, Rochester, NY (US)

(73) Assignee: Rohm and Haas Denmark Finance A/S, Copenhagen (DK)

( * ) Notice: Subject to any disclaimer, the term of this patent is extended or adjusted under 35 U.S.C. 154(b) by 215 days.

(21) Appl. No.: 10/992,923

(22) Filed: Nov. 19, 2004

(65) Prior Publication Data

US 2006/0109398 A1    May 25, 2006

(51) Int. Cl.
*G02F 1/1335*    (2006.01)
(52) U.S. Cl. ........................................ 349/96
(58) Field of Classification Search ............... 349/98, 349/96
See application file for complete search history.

(56) References Cited

U.S. PATENT DOCUMENTS

| | | | |
|---|---|---|---|
| 5,808,709 A * | 9/1998 | Davis et al. ................. | 349/65 |
| 5,828,488 A | 10/1998 | Ouderkirk et al. | |
| 6,642,977 B2 | 11/2003 | Kotchick et al. | |
| 6,661,482 B2 | 12/2003 | Hara | |
| 2003/0016316 A1 | 1/2003 | Sahouani et al. | |
| 2003/0164914 A1 | 9/2003 | Weber et al. | |
| 2004/0061802 A1 | 4/2004 | Maeda | |

FOREIGN PATENT DOCUMENTS

WO    WO 00/70400    11/2000

OTHER PUBLICATIONS

Patent Abstracts of Japan, Publication No. 2002099250 (Toshiba Corp).

USSN 10/939,656, filed Sep. 13, 2004 entitled, "Dark State Light Recycling aFilm and Display" by Xiang-Dong Mi.

"Cholesteric Colour Filters for Reflective and Transmissive LCDs" by R.T. Wegh, C. Doornkamp, and J. Lub in pp. 305-308 of *Eurodisplay 2002*.

"Low-power LCD Using a Novel Optical System" by Y. Taira et al., pp. 1313-1315, SID 02 Digest 2002.

"Micro-structured Polymeric Linearly Polarized Light Emitting Lightguide for LCD Illumination" by Henri J.B. Jagt et al., pp. 1236-1239, SID 02 Digest, 2002.

"Design Issues in Using Thin-Film Optical Interference Filters as Color Filters for LCD System Applications" by Chen and Shieh, National Chiao Tung University, Taiwan, R.O.C., pp. 411-616, SID 94 Digest.

* cited by examiner

*Primary Examiner*—James A. Dudek
(74) *Attorney, Agent, or Firm*—Edwin Oh

(57) ABSTRACT

A liquid crystal display has a backlight unit for providing substantially unpolarized illumination, a rear polarizer proximate the backlight unit for receiving the incident substantially unpolarized illumination and transmitting substantially polarized illumination. A liquid crystal spatial light modulator forms a modulated beam by selective, pixel-wise modulation of the polarization of the substantially polarized illumination. A color filter array transmits selected wavelengths of the modulated beam from the LC spatial light modulator. A front polarizer has a transmission axis for transmitting the portion of the modulated beam having polarization in alignment with the transmission axis. A reflective polarizing element is disposed between the liquid crystal spatial light modulator and the front polarizer for reflecting a portion of dark state light back toward the backlight unit.

2 Claims, 31 Drawing Sheets

Light state

Dark state

| Tf\f | 0.1 | 0.2 | 0.3 | 0.4 | 0.5 | 0.6 | 0.7 | 0.8 | 0.9 | 1 |
|---|---|---|---|---|---|---|---|---|---|---|
| 1 | 0.025911 | 0.0538 | 0.083937 | 0.116647 | 0.152325 | 0.191459 | 0.234664 | 0.282718 | 0.336636 | 0.397766 |
| 0.95 | -0.025385 | 0.00111 | 0.02974 | 0.060814 | 0.094708 | 0.131886 | 0.17293 | 0.218582 | 0.269804 | 0.327878 |
| 0.9 | -0.07668 | -0.05158 | -0.024456 | 0.004982 | 0.037092 | 0.072313 | 0.111197 | 0.154446 | 0.202972 | 0.25799 |
| 0.85 | -0.127976 | -0.10427 | -0.078653 | -0.05085 | -0.020524 | 0.01274 | 0.049464 | 0.09031 | 0.136141 | 0.188101 |
| 0.8 | -0.179271 | -0.15696 | -0.13285 | -0.106683 | -0.07814 | -0.046833 | -0.012269 | 0.026174 | 0.069309 | 0.118213 |
| 0.75 | -0.230567 | -0.20965 | -0.187047 | -0.162515 | -0.135757 | -0.106406 | -0.074002 | -0.037962 | 0.002477 | 0.048325 |
| 0.7 | -0.281862 | -0.26234 | -0.241244 | -0.218347 | -0.193373 | -0.165979 | -0.135736 | -0.102098 | -0.064355 | -0.021564 |

Light state

Dark state

Light state

Dark state

US 7,301,592 B2

DARK STATE LIGHT RECYCLING FILM AND DISPLAY

RELATED APPLICATIONS

Related, commonly assigned applications are the following: "Dark State Light Recycling Film And Display" in the name of Xiang-Dong Mi, U.S. Ser. No. 10/939,656, filed Sep. 13, 2004.

FIELD OF THE INVENTION

This invention generally relates to color LCD displays using polarizers and more particularly relates to an LCD display using, in combination, a reflective color filter array and a reflective polarizer to recycle dark state light that may otherwise be absorbed by a color filter array or by the front polarizer of the LCD.

BACKGROUND OF THE INVENTION

Conventional Liquid Crystal Device (LCD) displays form images by modulating the polarization state of illumination that is incident to the display surface. In a typical back-lit LCD display, an arrangement of polarizers is used to support the LCD modulation, including a rear polarizer, between the LCD and the light source, to provide polarized light to the LCD spatial light modulator and a front polarizer, acting as an analyzer. (By definition, the front polarizer is designated as the polarizer closest to the viewer.) In operation, each pixel on the display can have either a light state, in which modulated light that is aligned with the transmission axis of the front polarizer is emitted from the display, or a dark state, in which light is not aligned with the transmission axis of the front polarizer and is effectively blocked from emission.

Referring to FIG. 11, there is shown, in summary form, the behavior of key components of a liquid crystal display for handling incident polarized light to each pixel, showing the symbols and graphic conventions used in subsequent description. Orthogonal P- and S-polarization states are indicated by lines or circles, respectively, superimposed on arrows that indicate incident light direction. Transmission axes are similarly indicated by a double-sided arrow or a circle. An absorptive polarizer 50a, 50b, transmits polarized light that is aligned with its polarization axis and absorbs polarized light that is orthogonally oriented. By comparison, a reflective polarizer 52a, 52b transmits polarized light that is aligned with its polarization axis and reflects polarized light that is orthogonally oriented. An individual LC component 54a/54b modulates the incident beam by modulating the substantially polarized illumination beam in pixel-wise fashion. Following the convention used in this specification, an off state LC component 54a rotates the polarization of incident light. An on state LC component 54b does not rotate the polarization of incident light. The general nomenclature "LC component", as used in this disclosure, applies to a light-modulating element on the LCD spatial light modulator itself. The LCD spatial light modulator can be considered as an array of LC components 54a/54b.

There are two possible states for any pixel modulated by the LCD spatial light modulator: a dark state and a light state. In this application, the terms "dark state" and "light state" are used to describe the pixel state; the terms "on state" and "off state", as noted above, refer to the polarization activity of the LC component itself, rather than to the pixel state that is represented.

It is significant to observe that the characteristics of each type of LCD spatial light modulator determine whether or not the on state of each LC component provides a dark state or light state to its corresponding pixel. As stated above, the examples illustrated in the present application use the following convention:

(i) an on state LC component 54b provides a dark state pixel;

(ii) an off state LC component 54a provides a light state pixel. However, the opposite pairing of on and off states to light and dark state pixels is also possible. For subsequent description in this application, except where specifically noted otherwise, the convention stated here and illustrated in FIG. 11 applies.

In addition to supporting components for polarization and polarized light recycling, an LC component also has a Color Filter Array (CFA) in typical applications. FIG. 1 shows a conventional arrangement of LCD display 10 with a front polarizer 50a, rear polarizer 50b, a backlight unit 56, a reflective film 57, with off state LC component 54a that converts S-polarization (circle) to P-polarization (line) and, conversely, converts P-polarization to S-polarization. An on state LC component 54b performs no polarization conversion. Both off state LC component 54a and on state LC component 54b are shown segmented into three separate sections for the three color components of each pixel. A color filter array 60, in the path of the modulated beam formed by the array of LC components 54a and on state LC components 54b, provides a corresponding arrangement of color filters, labeled 60r for red, 60g for green, and 60b for blue. (For simplicity, individual color filters 60r, 60g, and 60b are labeled only when necessary in subsequent figures.) In conventional LC component designs, component color filters 60r, 60g, and 60b of color filter array 60 are absorptive.

As is well known, display images are typically formed using multiple colors in combination (red+green+blue, for example) in the modulated beam. To allow more straightforward description, FIGS. 1-10D are simplified to show the handling of light of only a single color (typically one of red, green, or blue light) at a time. In practice, multiple colors would be handled as described for the embodiments of FIGS. 1-10D.

Unpolarized light is emitted from backlight 56. In this light state, only light having S-polarization is transmitted through rear polarizer 50b. The intended light for each red (R), green (G), or blue (B) color component is transmitted through its corresponding component color filter 60r, 60g, or 60b of color filter array 60; other colors are absorbed by the other two component color filters 60r, 60g, or 60b. Only P-polarized light transmitted through off state LC component 54a is transmitted through front polarizer 50a; S-polarized light is absorbed by front polarizer 50a.

Due to absorption by rear polarizer 50b and absorption by color filter array 60, only about ⅙ of the available light can be provided at the output for a single light pixel. It can be readily appreciated that there would be benefits to component arrangements that increase the amount of available light for each light pixel.

Referring to FIG. 2, there is shown the arrangement of a conventional LC display 10 that increases the available light by polarization recycling. Here, a reflective polarizer 52b is disposed between backlight unit 56 rear polarizer 50b. This arrangement provides an approximately 2× increase in available brightness over the conventional arrangement of FIG. 1.

Additional brightness increase can be obtained using color recycling, with a reflective color filter array 62b, as is shown in the example of FIG. 3A. Using reflective color filter array 62b, the absorption requirement for color filter array 60 is greatly reduced and more light is provided, yielding up to about a 3× brightness increase over the conventional arrangement of FIG. 1. FIG. 3B shows an alternate arrangement using reflective color filter array 62b between rear polarizer 50b and the LC component. Since rear polarizer 50b is absorptive and is in the path of light recycling by the reflective color filter array 62b, the FIG. 3B arrangement yields, for a light pixel, about half of the brightness of the arrangement of FIG. 3A. Polarization and color recycling can be provided by a single film component, as is described in the article entitled "Cholesteric Colour Filters for Reflective and Transmissive LCDs" by R. T. Wegh, C. Doornkamp, and J. Lub in pp. 305-308 of *Eurodisplay* 2002. Referring to FIG. 4A, there is shown a schematic of a conventional LC display 10 arrangement using a reflective polarizing color filter array (RPCFA) 63b, as described in the Wegh et al. article. FIGS. 4B and 4C show two different arrangements of RPCFA 63b. In FIG. 4B, RPCFA 63b has its component reflective color filter array 62b atop its reflective polarizer 52b with respect to backlight unit 56. In FIG. 4C, the reverse arrangement is used, with reflective polarizer 52b atop reflective color filter array 62b relative to backlight unit 56. This component can also include a quarter-wave plate.

As can be appreciated from the above description, reflective polarizers and reflective color filter arrays can help to increase light output of an LC display device. In conventional practice, a number of rules-of-thumb apply for placement of these film components in the layered arrangement of the LC display 10, as was shown in FIGS. 2, 3A, 3B, 4B, and 4C:

(i) Reflective polarizer 52b is positioned between backlight unit 56 and rear polarizer 50b. Otherwise, rear polarizer 50b must absorb half of the incident light, that is, light having a polarization state orthogonal to its transmission axis.

(ii) Reflective color filter array 62b is placed between backlight unit 56 and LC component 54a/54b. In addition, conventional practices would direct placement of reflective polarizing color filter array (RPCFA) 63b to some position between backlight unit 56 and LC component 54a/54b.

The conventional arrangement using a reflective polarizer, as summarized in FIGS. 2A-2D, is described in a number of patent disclosures, including:

U.S. Pat. No. 6,661,482 entitled "Polarizing Element, Optical Element, and Liquid Crystal Display" to Hara;

U.S. Pat. No. 5,828,488 entitled "Reflective Polarizer Display" to Ouderkirk et al.;

U.S. Patent Application Publication 2003/0164914 entitled "Brightness Enhancing Reflective Polarizer" by Weber et al.; and, U.S. Patent Application Publication 2004/0061812 entitled "Liquid Crystal Display Device and Electronic Apparatus" by Maeda.

It is known to use different types of polarizers with an LC display in order to achieve specific effects, depending on how the display is used. For example, U.S. Pat. No. 6,642, 977 entitled "Liquid Crystal Displays with Repositionable Front Polarizers" to Kotchick et al. discloses a liquid crystal display module for a portable device, wherein the front polarizer may be any of a number of types and can be tilted or positioned suitably for display visibility. Similarly, U.S. Patent Application Publication Ser. No. 2003/0016316 entitled "Interchangeable Polarizers for Electronic Devices Having a Liquid Crystal Display" by Sahouani et al. discloses a device arrangement in which different types of front polarizers may be removably interchanged in order to achieve a suitable display effect. Among possible arrangements noted in both the '977 Kotchick et al. and the '16316 Sahouani et al. disclosures is the use of a reflective polarizer as the front polarizer for an LC display. It is significant to note that both the '977 Kotchick et al. and the '16316 Sahouani et al. disclosures emphasize that this arrangement would not be desirable in most cases, except where special "metallic" appearance effects, not related to increased brightness and efficiency, are deliberately intended. As both the '977 Kotchick et al. and the '16316 Sahouani et al. disclosures show, established practice teaches the use of reflective polarizer 52b between the illumination source, backlight unit 56, and rear polarizer 50b, as is shown in the arrangement of FIG. 2, for improved brightness and efficiency. Established practice clearly does not use reflective polarizer 52b on the viewing side of LC component 54a/54b, except, where a "metallic-looking" display appearance is desired, as a less desirable substitute for front polarizer 50a. The use of a reflective polarizer in the place of front polarizer 50a causes a dramatic loss in contrast ratio, effectively eliminating any possible benefit in increased brightness.

While conventional placement of reflective polarizers, reflective color filter arrays, and RPCFAs provides a measure of increased efficiency and brightness for LC displays, there is a recognized need for improvement in display brightness, without adding cost or complexity to existing designs.

PROBLEM TO BE SOLVED BY THE INVENTION

There is a need for an LC display having improved efficiency and enhanced brightness.

SUMMARY OF THE INVENTION

It is an object of the present invention to provide an LC display capable of increased brightness and efficiency. With this object in mind, the present invention provides a liquid crystal display comprising:

(a) a backlight unit for providing illumination;

(b) a rear polarizer disposed proximate the backlight unit for receiving the incident illumination and transmitting substantially polarized illumination;

(c) a liquid crystal spatial light modulator for forming a modulated beam by selective, pixel-wise modulation of the polarization of the substantially polarized illumination;

(d) a color filter array for transmitting selected wavelengths of the modulated beam from the LC spatial light modulator;

(e) a front polarizer having a transmission axis for transmitting the portion of the modulated beam having polarization in alignment with the transmission axis; and, (f) a reflective polarizing element disposed between the liquid crystal spatial light modulator and the front polarizer, the reflective polarizing element reflecting a portion of dark state light back toward the backlight unit.

It is a feature of the present invention that a reflective polarizer and color filter array are deployed in the modulated beam for reflecting dark state light for reuse.

It is an advantage of the present invention that it provides incremental improvement in LC display brightness and efficiency over conventional designs.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The apparatus and method of the present invention obtain improved efficiency and brightness from an LCD display by using one or more reflective polarizers in cooperation with color filter arrays to recycle dark state light. Commonly assigned, copending application "Dark State Light Recycling Film And Display" in the name of Xiang-Dong Mi, U.S. Ser. No. 10/939,656, filed Sep. 13, 2004, noted above, introduced the concept and application of dark state light recycling for increasing display efficiency and brightness. The present invention expands the application of this concept to LCD display configurations using color filter arrays of both the conventional, absorptive type and reflective type. In addition, the present invention also discloses arrangements for optimizing the use of reflective polarization color filter arrays with an LC display device.

As was noted in the background section given above, it has been pointed out that use of a reflective polarizer in place of front polarizer 50a is not advantageous for improving either brightness or contrast. Embodiments of the present invention employ a reflective polarizing element of some type in any of a variety of LCD display configurations. The reflective polarizing element itself may be embodied in a single article or component, such as in a single sheet of film, or may use some combination of reflective polarization and color filter components, incorporated within a more complex reflective polarizing color filter array similar to that described in the Wegh et al. article cited earlier, for example. In each of the various embodiments of the present invention, the reflective polarizing element is disposed in the path of the modulated beam, between the liquid crystal spatial light modulator and front polarizer in an LCD display apparatus.

Dark State Recycling

Figure 12A:
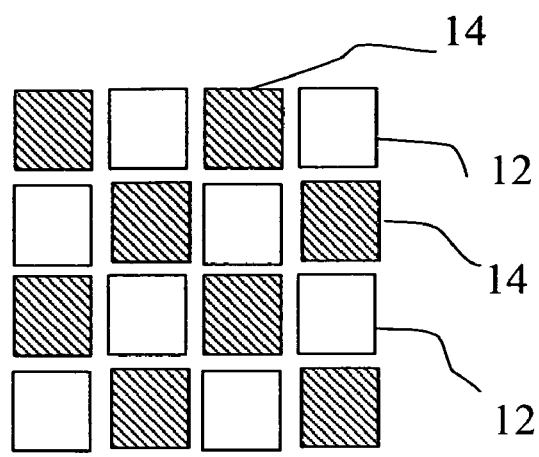
FIG. 12A is a top view showing a pattern of pixels for a typical image.
Figure 12B:
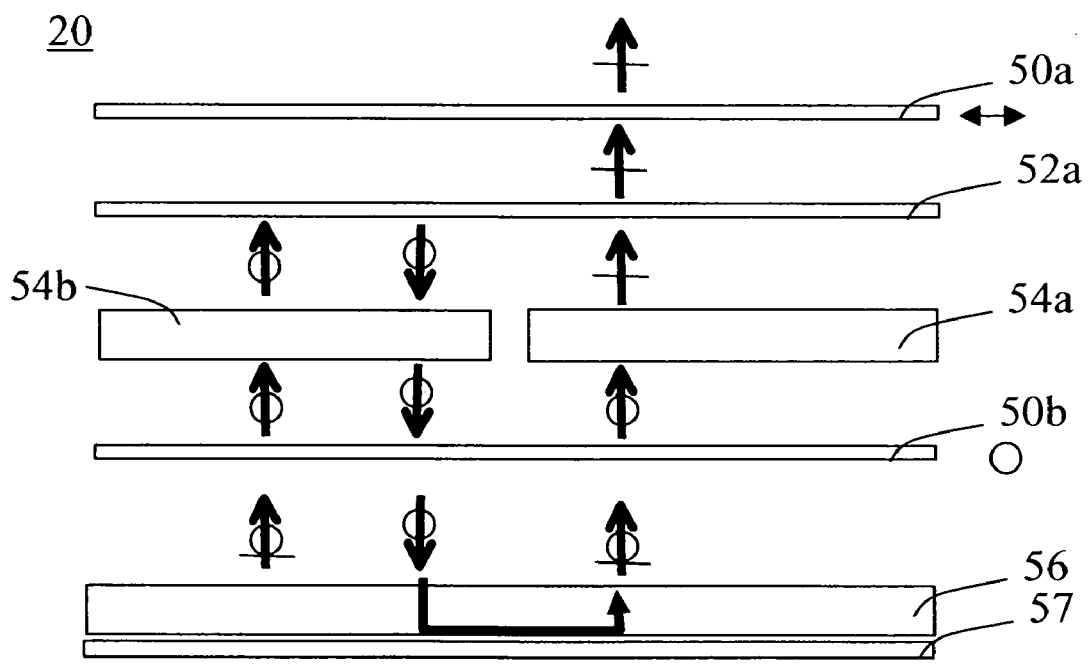
FIG. 12B is a schematic diagram showing, from a cross-sectional side view, two adjacent LC components, one in an off state, one in an on state.

Referring to FIG. 12A, there is shown a plan view of a portion of an LCD display 20 with dark pixels 14 and light pixels 12. As FIG. 12A represents, each image formed by a modulated beam from LCD display 20 has a percentage of dark pixels 14 and light pixels 12. The apparatus and method of the present invention takes advantage of light that is not needed for dark pixels 14 and redirects a portion of this light to light pixels 12. This behavior is summarized in FIG. 12B which shows how light can be redirected from dark pixel 14, formed by on state LC component 54b, to light pixel 12, formed by off state LC component 54a. In the embodiments described subsequently, one or more color filter arrays are added to this scheme, including new types of color filter array components.

For describing how dark state recycling works in practice, the following variables are defined:

$I_0$ total flux of light from backlight unit 56 x percentage of dark pixels 14 to the total number of pixels

1−x percentage of light pixels 12 to the total number of pixels $T_{\parallel}$ transmittance of an absorptive polarizer (front polarizer 50a and rear polarizer 50b) for light polarized along the transmission axis.

$T_{lc}$ transmittance of the liquid crystal layer. As a first approximation, it can be assumed that $T_{lc}$ is the same for both on-state and off-state.

$T_f$ transmittance of front reflective polarizer 52a that is placed between front absorptive polarizer 50a and LC component 54a/54b.

$R_f$ reflectance of front reflective polarizer 52a that is placed between front absorptive polarizer 50a and LC component 54a/54b

$T_r$ transmittance of rear reflective polarizer 52b that is placed between rear absorptive polarizer 50b and LC component 54a/54b.

$R_r$ reflectance of rear reflective polarizer 52b that is placed between rear absorptive polarizer 50b and LC component 54a/54b

R reflectance of backlight unit 56.

Dark State Light Recycling Without a Conventional Reflective Polarizer

Figure 13A:
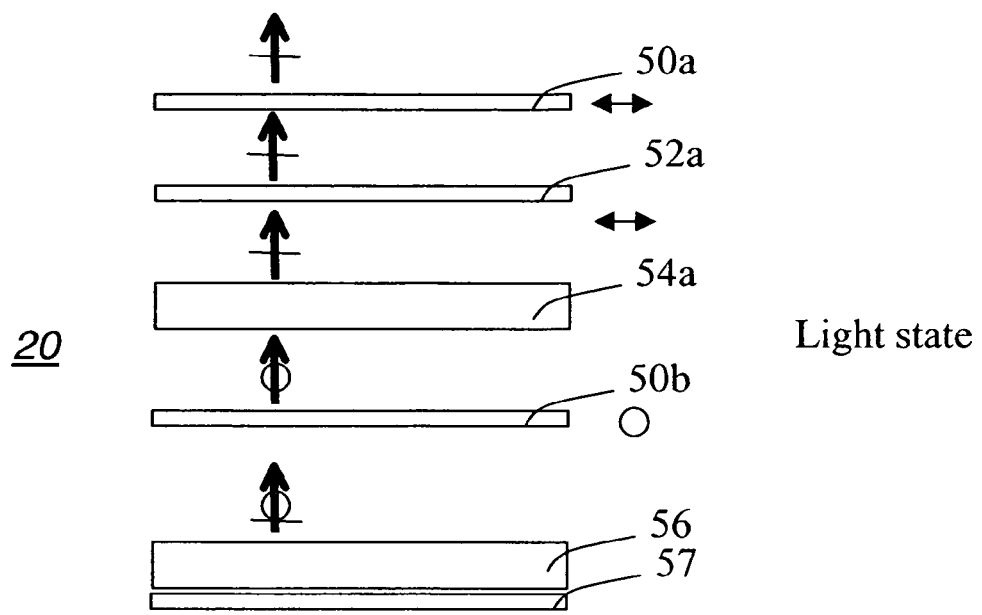
FIG. 13A is a schematic diagram showing, from a cross-sectional side view, an LC component of an LCD display in a light state having a front polarizer and a rear polarizer and a reflective polarizer between the front polarizer and the LC component according to a key principle of the present invention.
Figure 13B:
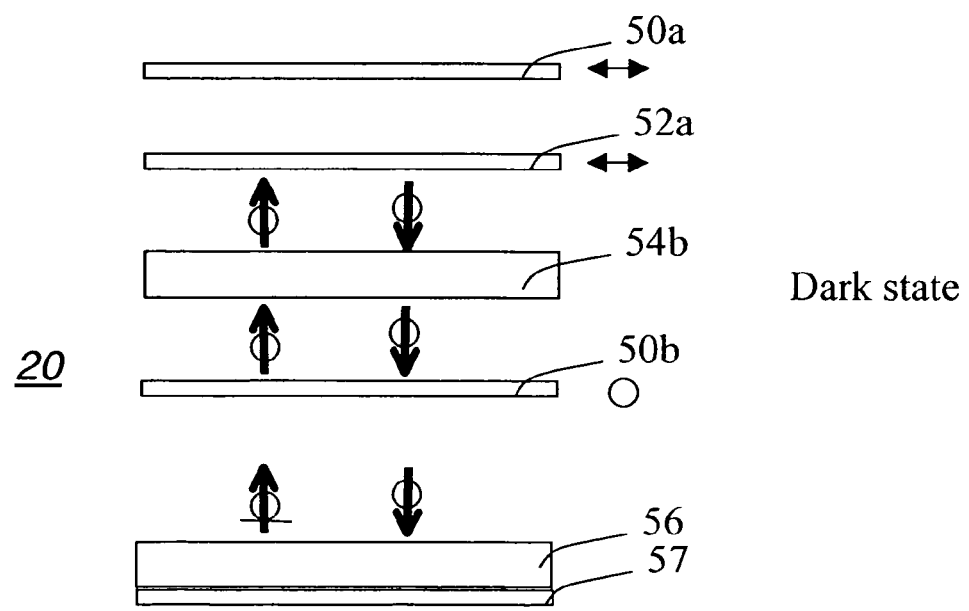
FIG. 13B is a schematic diagram showing, from a cross-sectional side view, an LC component of an LCD display in a dark state having a front polarizer and a rear polarizer and a reflective polarizer between the front polarizer and the LC component according to a key principle of the present invention.
Figure 14A:
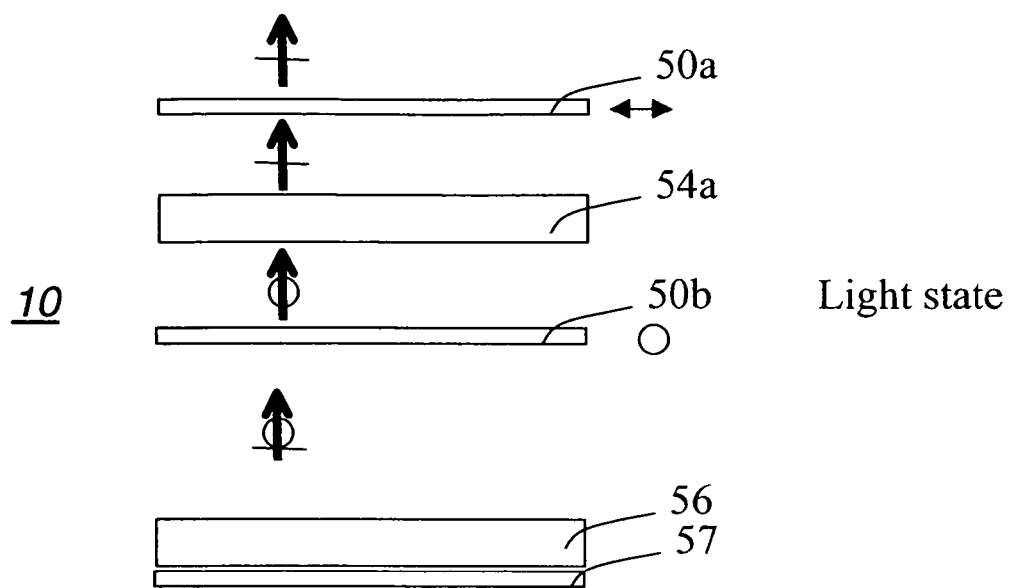
FIG. 14A is a schematic diagram showing, from a cross-sectional side view, an LC component of an LCD display in a light state having a front polarizer and a rear polarizer.
Figure 14B:
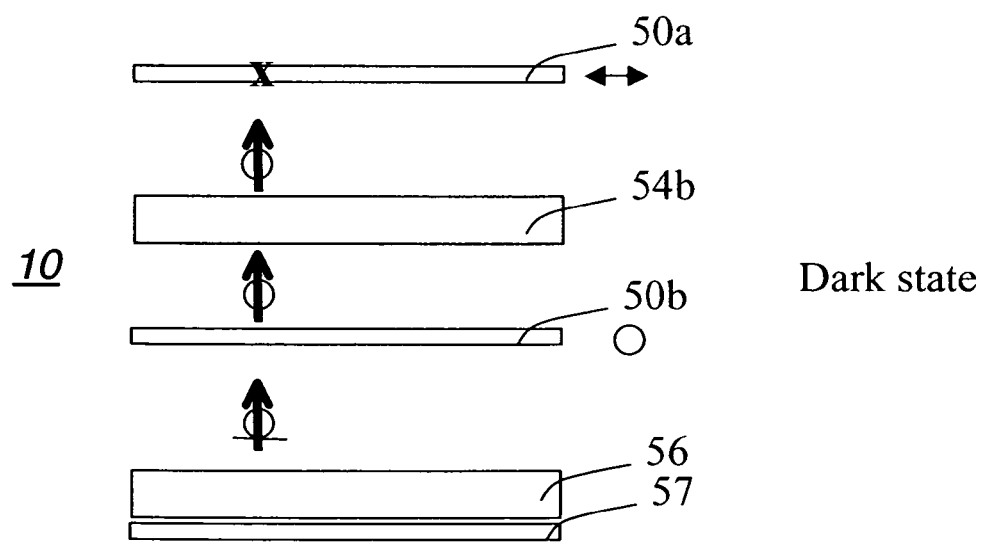
FIG. 14B is a schematic diagram showing, from a cross-sectional side view, an LC component of an LCD display in a dark state having a front polarizer and a rear polarizer.

Dark state recycling according to a first embodiment of the present invention can be illustrated by comparing light behavior in FIGS. 13A and 13B to light behavior in the conventional arrangement of FIGS. 14A and 14B.

Without dark state light recycling, as shown in FIG. 14A the total flux of light emitted from light pixels 12, with the percentage being 1−x, is as follows:

$$I_{total0} \approx 0.5 I_0 T_{\parallel}^2 T_{lc}(1-x)$$

With dark state light recycling, that is, with reflective polarizer 52a placed between the front absorptive polarizer 50a and LC component 54a or 54b, the flux of light from light pixels 12, with the percentage being 1−x, is approximately $0.5 I_0 T_{\parallel}^2 T_{lc} T_f (1-x)$. (See FIG. 13A).

The flux reflected back from dark pixels 14, with the percentage being x, and from backlight unit 56 is approximately $0.5 I_0 T_{\parallel}^2 T_{lc}^2 R_f Rx$. (See FIG. 13B).

This flux has a probability for being redirected though light pixels 12 of 1−x, and a probability for being redirected to dark pixels 14 of x.

After first recycling, the total flux coming out of light pixels 12 is $$I_{total1} \approx 0.5 I_0 T_{\parallel}^2 T_{lc} T_f(1-x) + 0.5 I_0 T_{\parallel}^2 T_{lc}^2 R_f Rx \cdot 0.5 T_{\parallel}^2 T_{lc} T_f(1-x) =$$
$$0.5 I_0 T_{\parallel}^2 T_{lc} T_f(1-x)[1 + 0.5 T_{\parallel}^2 T_{lc}^2 R_f Rx]$$

After second recycling, the total flux coming out of light pixels 12 is $$I_{total2} \approx I_{total1} + (0.5 I_0 T_{\parallel}^2 T_{lc}^2 R_f Rx)^2 \cdot 0.5 I_0 T_{\parallel}^2 T_{lc} T_f(1-x) =$$
$$0.5 I_0 T_{\parallel}^2 T_{lc} T_f(1-x)\left[1 + 0.5 T_{\parallel}^2 T_{lc}^2 R_f Rx + (0.5 T_{\parallel}^2 T_{lc}^2 R_f Rx)^2\right]$$

The total flux coming out of light pixels 12, then, is $$I_{DS} \approx 0.5 I_0 T_{\parallel}^2 T_{lc} T_f(1-x)\left[1 + 0.5 T_{\parallel}^2 T_{lc}^2 R_f Rx + (0.5 T_{\parallel}^2 T_{lc}^2 R_f Rx)^2 + \ldots \right] =$$
$$0.5 I_0 T_{\parallel}^2 T_{lc}(1-x) \frac{T_f}{1 - 0.5 T_{\parallel}^2 T_{lc}^2 R_f Rx}$$

The gain is defined as $$Gain_{DS} = \frac{I_{DS}}{I_{total0}} - 1 = \frac{T_f}{1 - 0.5 T_{\parallel}^2 T_{lc}^2 R_f Rx} - 1$$

In an ideal case, $T_\parallel$, $T_{lc}$, $T_f$, $R_f$, and R are all equal to 1, thus $$Gain = \frac{1}{1-0.5x} - 1.$$

The maximum gain is 100% when x approaches 100%. The gain is 33% when x=50%. The gain is 0% when x=0%. The maximum gain of 100% is limited by rear polarizer 50*b*, which absorbs half of the light when the dark state light is recycled on each path.

Let $f=T_\parallel^2 T_{lc}^2 R_f R$, then $$Gain_{DS} = \frac{T_f}{1-0.5fx} - 1$$

In practice, $T_\parallel \cong 0.95$, $T_{lc} \cong 0.95$, $T_f \cong 0.9$, $R_f \cong 0.95$, $R \cong 0.9$, $f \cong 0.7$.

Figure 15A:
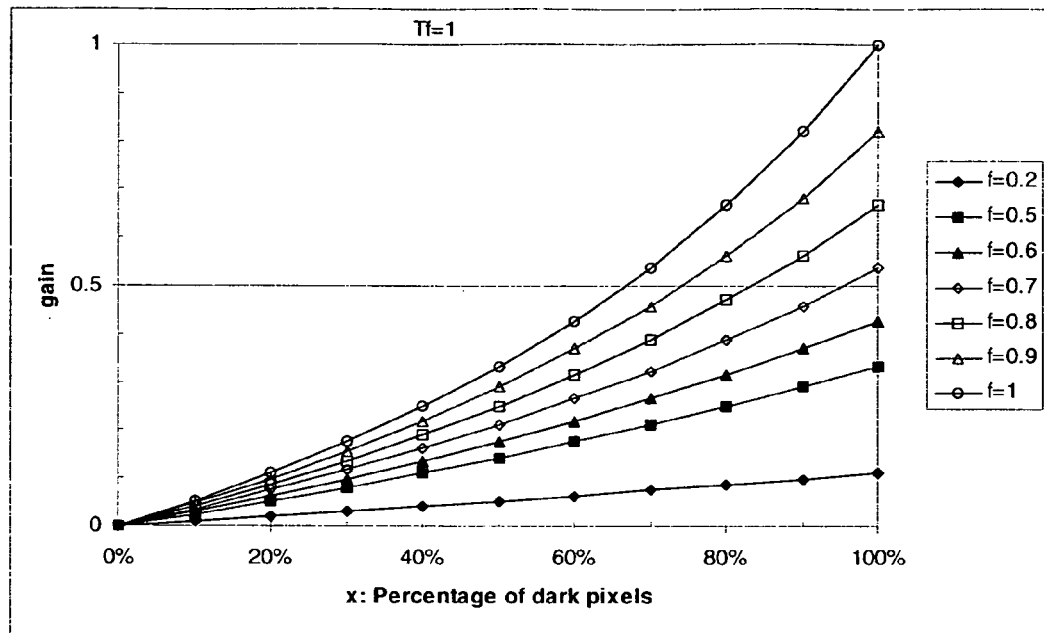
FIGS. 15A-15C are graphs showing the relative efficiency gain based on the overall proportion of dark to light pixels.
Figure 15B:
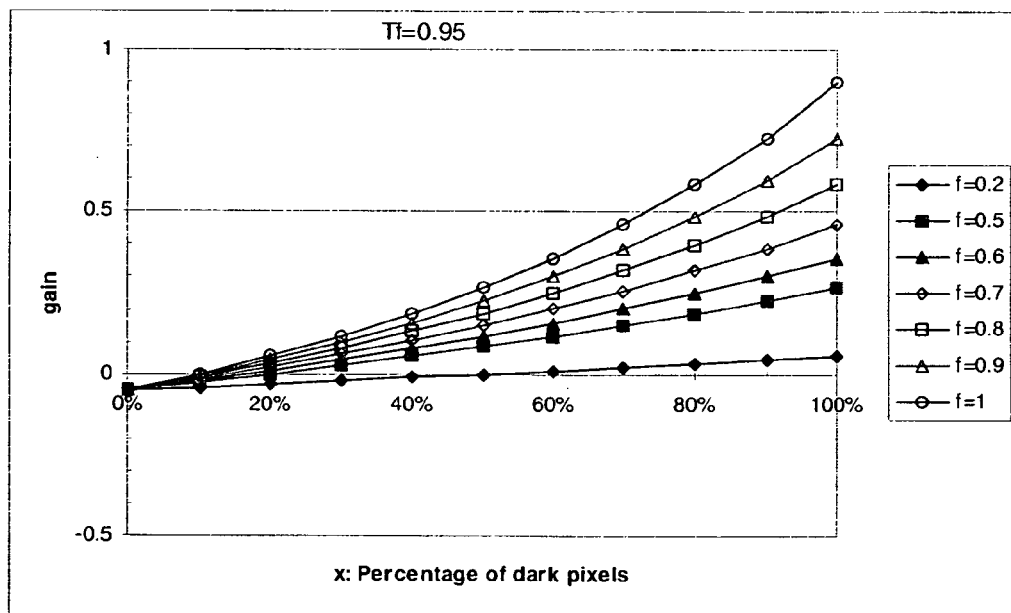
Figures 15C, 16:
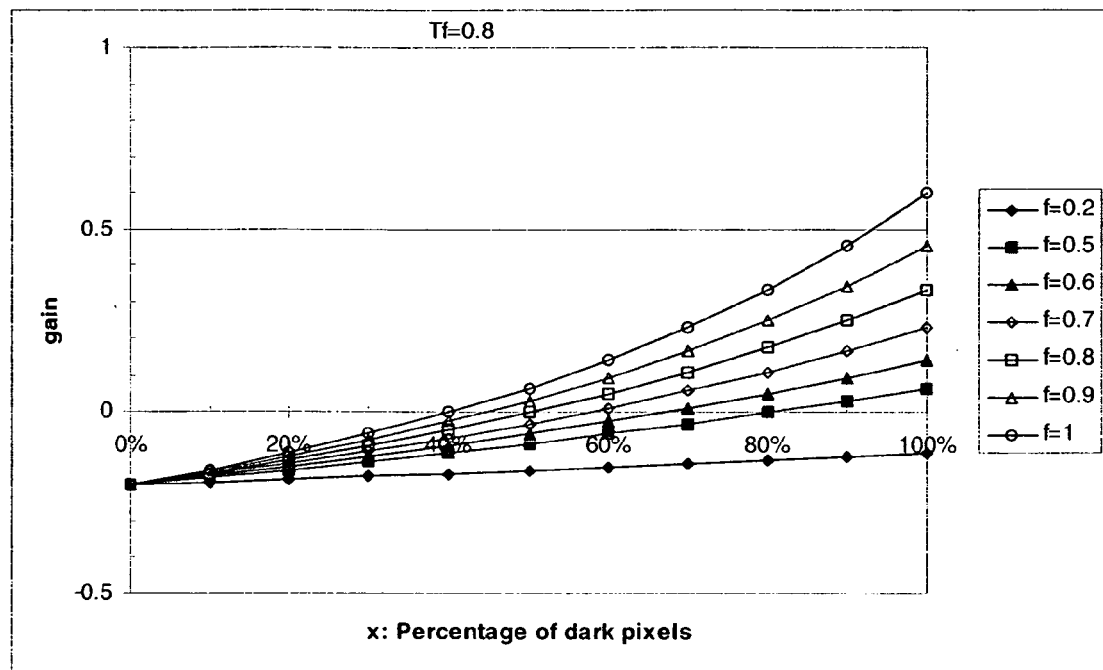
FIG. 16 is a table showing calculated values of gain relative to transmittance, using the method of the present invention.

FIGS. 15A, 15B, and 15C show gain vs percentage of dark pixels 14 x for a transmittance $T_f$ of reflective polarizer 52*a* at 100%, 95%, and 80%, respectively. In all cases, for given percentage of dark pixels 14, the higher the factor $f$, the higher the gain. At a fixed $f$, the higher the percentage of dark pixels 14, the higher the gain.

As shown in FIG. 15A, when the transmittance $T_f$ of reflective polarizer 52*a* is 100%, the gain is always positive independent of the factor $f$ and the percentage of dark pixels 14, x. When $f=1$ in an ideal case and x approaches 100%, the gain is 100%.

Referring to FIG. 15B, when the transmittance $T_f$ of reflective polarizer 52*a* is less than 100%, here about 95%, the gain can be negative for small x, which indicates that there can be actual loss in light efficiency for an image with a small number of dark pixels 14 (or, conversely, with a large number of light pixels 12). But for an image with a large number of dark pixels 14 (or a small number of light pixels 12), i.e., a large x, the gain is positive.

Referring to FIG. 15C, when the transmittance $T_f$ of reflective polarizer 52*a* is low enough, for example, 80%, the gain can be negative for all x between 0 and 1 for a small $f$ (for example, $f=0.2$). But for a reasonably designed LCD system, in general, $f \geq 0.7$. The curve corresponding to $f=0.7$ shows a positive gain when the percentage of dark pixels x≥0.6.

Thus, it can be observed that dark state light recycling gain depends on the image shown on the display. To further quantify the gain, an average gain over x from 0 to 1 with equal weight is calculated at various $f$ and $T_f$ values. The average gain is shown in the table of FIG. 16. In order to have positive gain rather than loss, the factors $f$ and $T_f$ should obtain a value within the upper triangle of this table. For example, when $T_f=0.75$ and $f \geq 0.9$, the average gain is positive. When $T_f=0.9$ and $f \geq 0.4$, the average gain is also positive. When $T_f=0.9$ and $f=0.7$, the average gain is about 11%. The ranges of values $f$ and $T_f$ may vary when different criteria are adopted. The gain in light efficiency may also vary with the image pattern distribution rather than simply with the raw percentage of dark pixels 14.

Figure 17A:
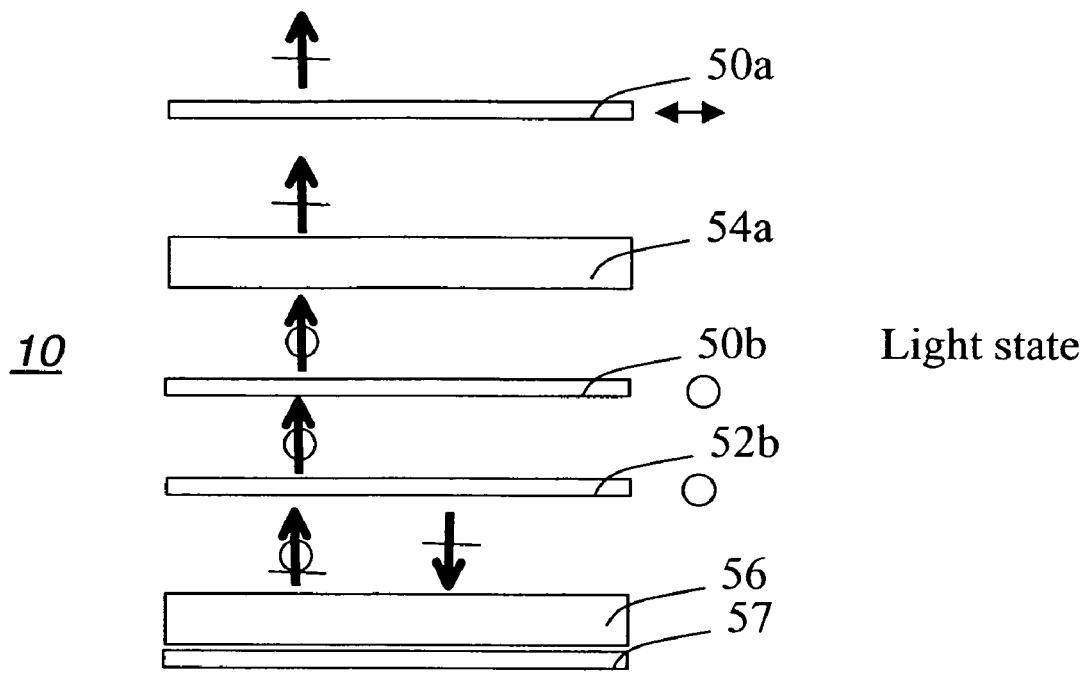
FIG. 17A is a schematic diagram showing, from a cross-sectional side view, an LC component of an LCD display in a light state having a front polarizer and a rear polarizer and a reflective polarizer in a conventional arrangement.
Figure 17B:
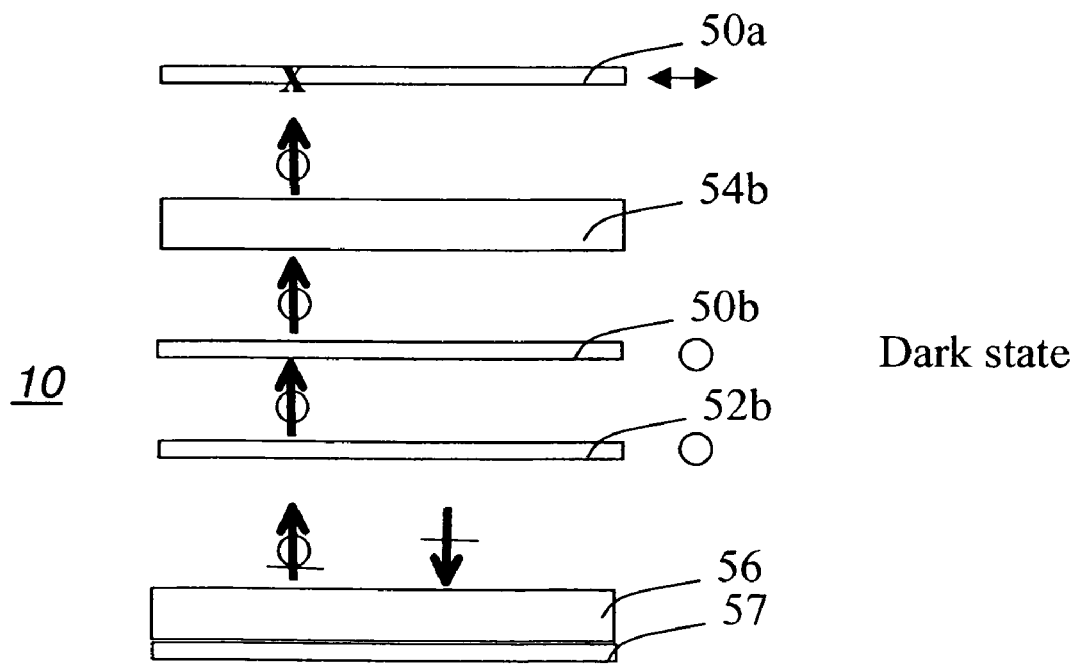
FIG. 17B is a schematic diagram showing, from a cross-sectional side view, an LC component of an LCD display in a dark state having a front polarizer and a rear polarizer and a reflective polarizer in a conventional arrangement.
Figure 18A:
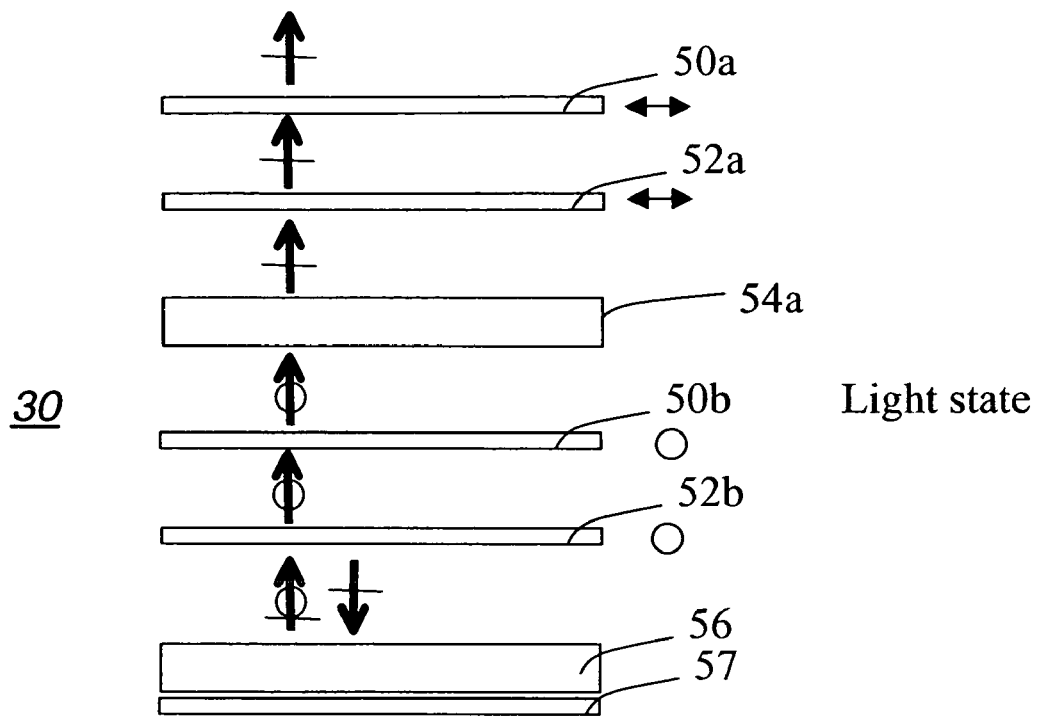
FIGS. 18A and 18B are schematic diagrams showing, from a cross-sectional side view, the principle of operation of a set of embodiments of the present invention that use a second reflective polarizer between the rear polarizer and the backlight unit.
Figure 18B:
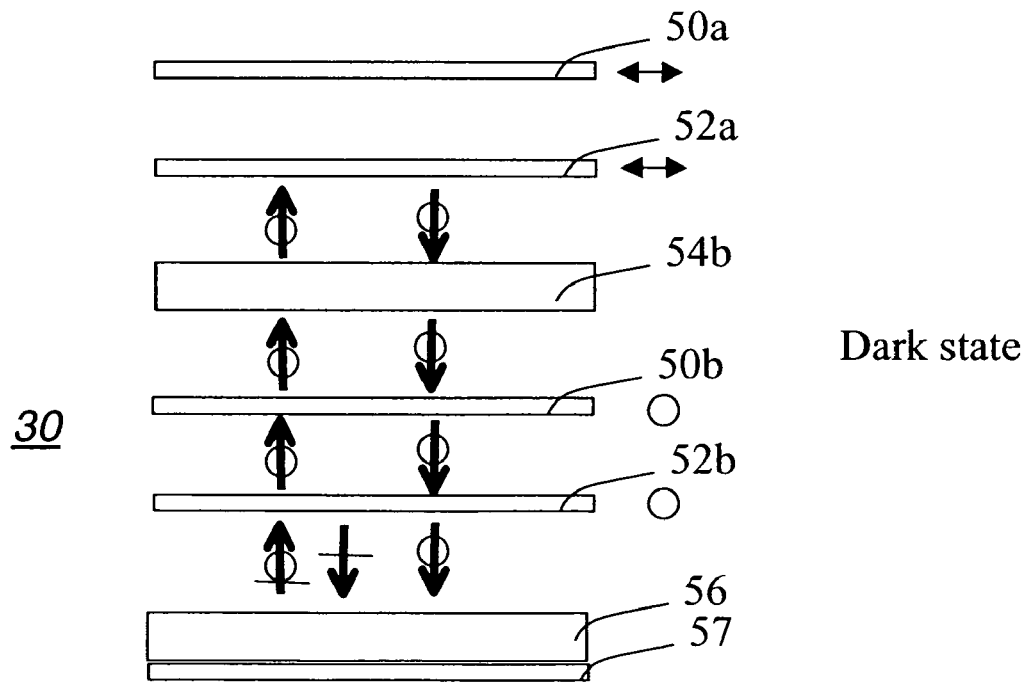

Dark State Light Recycling in Combination with a Conventional Reflective Polarizer Dark state recycling according to another embodiment of the present invention can be illustrated by comparing light behavior in FIGS. 18A and 18B to light behavior in the conventional arrangement of FIGS. 17A and 17B.

Referring to FIGS. 17A and 17B, without dark state light recycling and with conventional polarization recycling done by the reflective polarizer 52*b*, the total flux of light emitted from light pixels 12, with the percentage being 1-x, $$I_{total}^{RP} \approx 0.5 I_0 T_\parallel^2 T_{lc}(1-x) \frac{T_r}{1-0.5 R_r R} \leq 2 I_{total 0}$$

Referring to FIGS. 18A and 18B, additional dark state light recycling takes place with reflective polarizer 52*a* placed between front absorptive polarizer 50*a* and LC component 54*a* or 54*b*, total flux coming out of light pixels 12, with the percentage being 1-x, is $$I_{DS}^{RP} \approx 0.5 I_0 T_\parallel^2 T_{lc}(1-x) \frac{T_r}{1-0.5 R_r R} \frac{T_f}{1-T_\parallel^2 T_{lc}^2 R_f R x}.$$

The gain compared to the case with polarization recycling by a conventional reflective polarizer is defined as $$Gain_{DS}^{RP} = \frac{I_{DS}^{RP}}{I_{total}^{RP}} - 1 = \frac{1}{1-T_\parallel^2 T_{lc}^2 R_f R x} - 1$$

In an ideal case, $T_\parallel$, $T_{lc}$, $T_f$, $R_f$, and R are all equal to 1, thus $$Gain_{DS}^{RP} = \frac{1}{1-x} - 1.$$

Thus, ideally, the maximum gain has no upper limit when x approaches 100%.

The gain is 100% when x=50%. The gain is 0% when x=0%.

Let $f=T_\parallel^2 T_{lc}^2 R_f$, then $$Gain_{DS}^{RP} = \frac{T_f}{1-fx} - 1$$

In practice, $T_\parallel \cong 0.95$, $T_{lc} \cong 0.95$, $T_f \cong 0.9$, $R_f \cong 0.95$, $R \cong 0.9$, $f \cong 0.7$. In this case, $Gain_{DS}^{RP}=200\%$ when x approaches 100%. $Gain_{DS}^{RP}=38\%$ when x=50%.

FIRST EMBODIMENT

Figure 1:
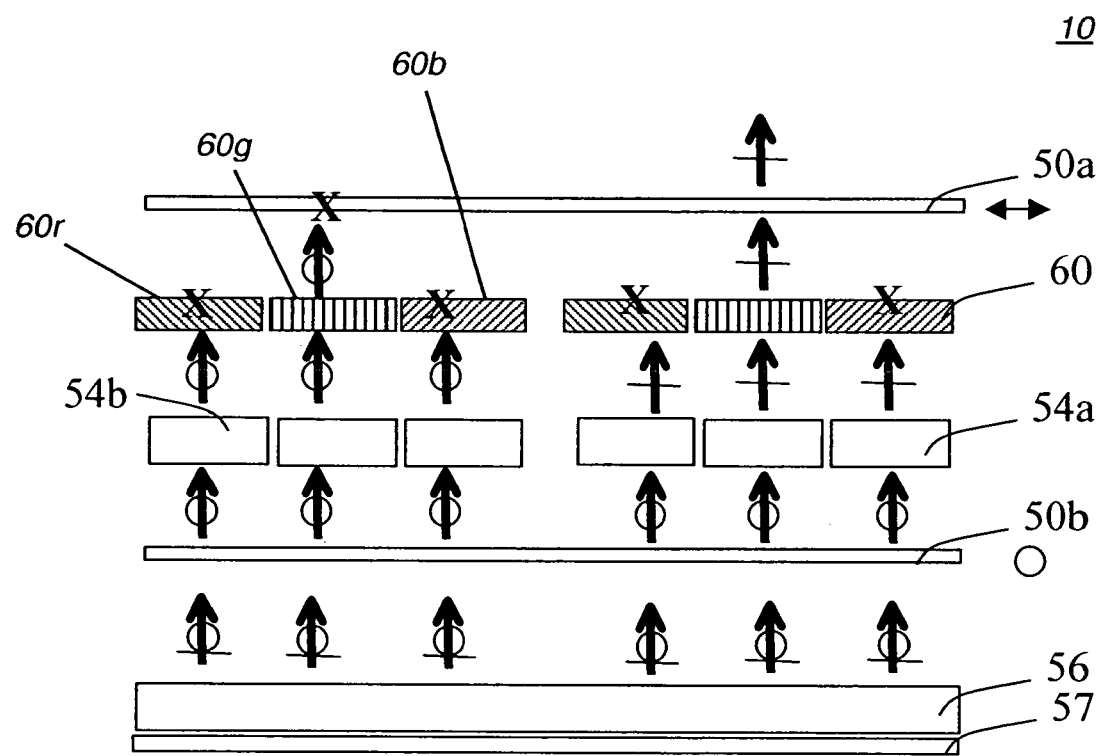
FIG. 1 is a schematic diagram showing, from a cross-sectional side view, an LCD display having a front polarizer, a rear polarizer, and an absorptive color filter array, showing light behavior for dark and light state pixels.
Figure 2:
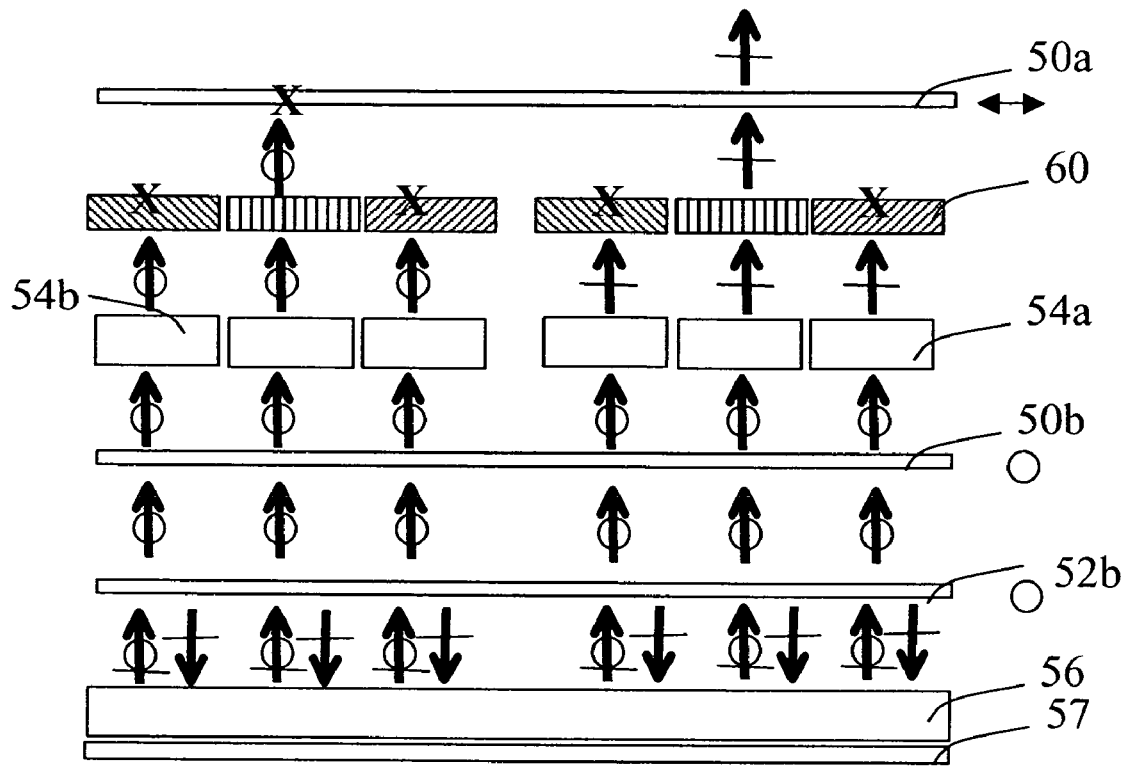
FIG. 2 is a schematic diagram showing, from a cross-sectional side view, an LCD display having a front polarizer, a rear polarizer, a reflective polarizer, and an absorptive color filter array, showing light behavior for dark and light state pixels.
Figure 3A:
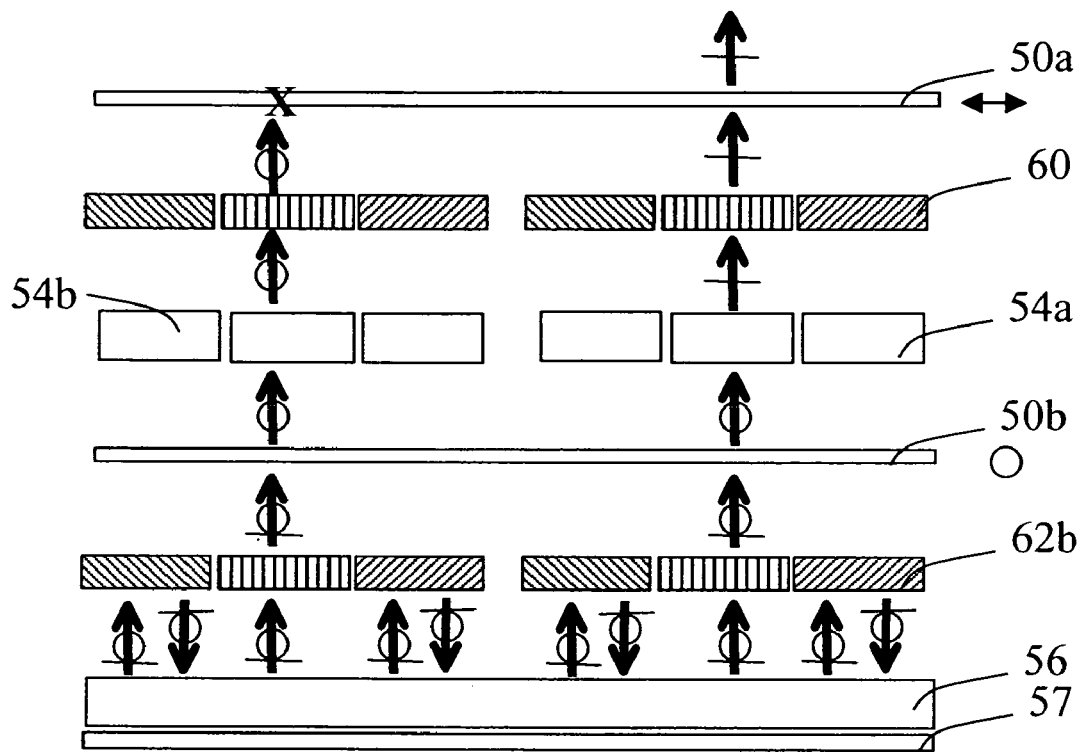
FIGS. 3A and 3B are schematic diagrams showing, from a cross-sectional side view, embodiments of an LCD display having a front polarizer, a rear polarizer, an absorptive color filter array, and a reflective color filter array, showing light behavior for dark and light state pixels.
Figure 3B:
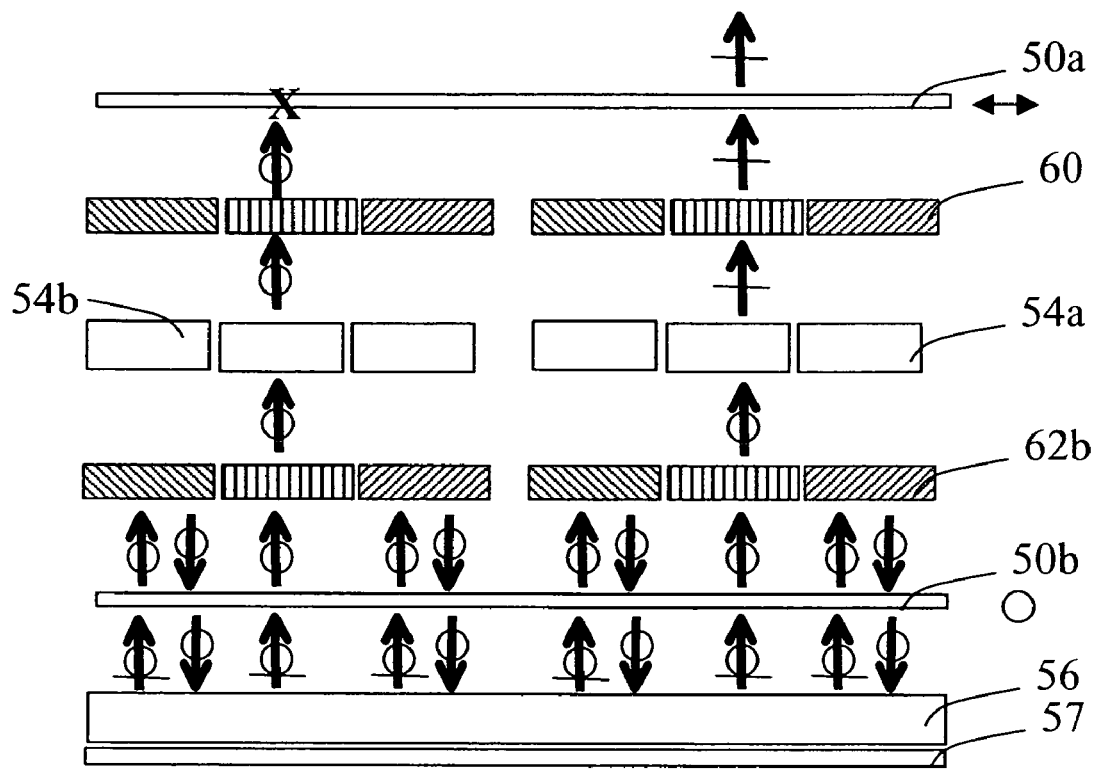
Figure 4A:
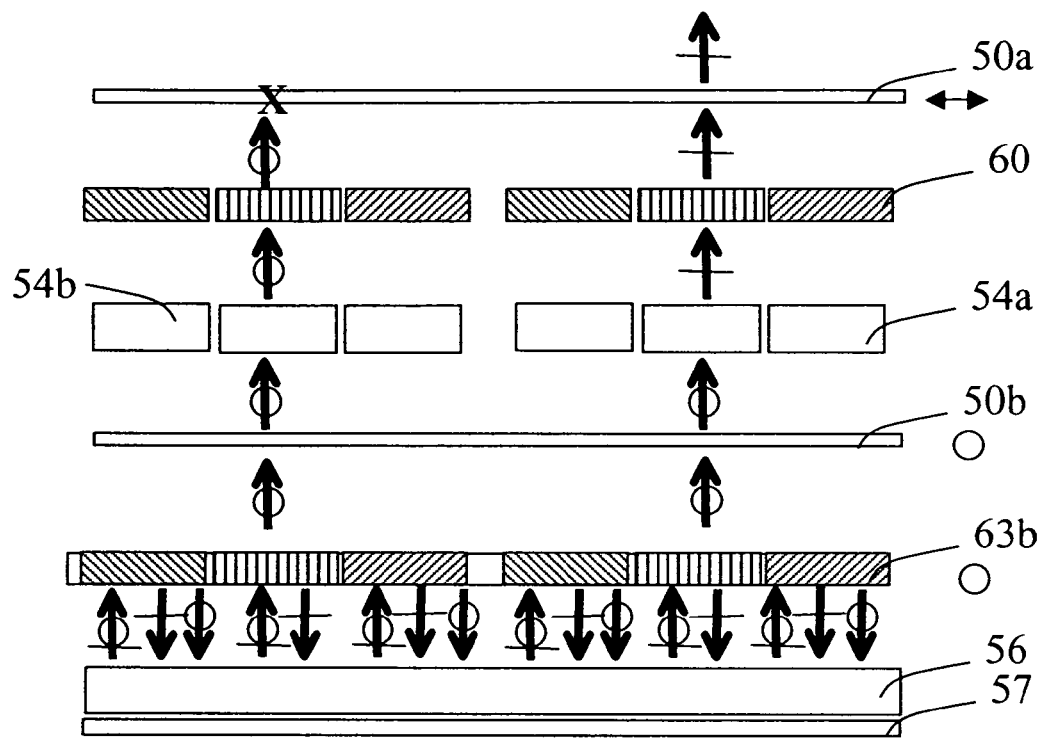
FIG. 4A is a schematic diagram showing, from a cross-sectional side view, an LCD display having a front polarizer, a rear polarizer, a reflective polarizing color filter array, and an absorptive color filter array, showing light behavior for dark and light state pixels.
Figure 4B:
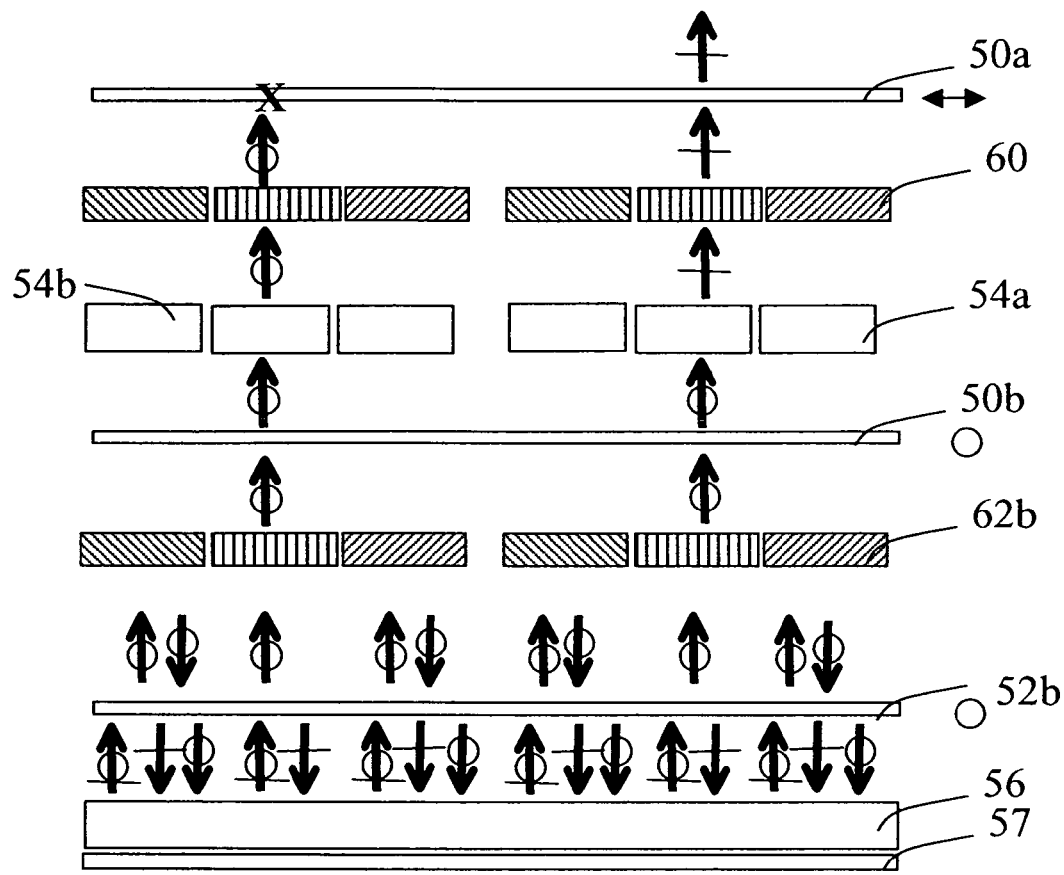
FIGS. 4B and 4C are schematic diagrams showing, from a cross-sectional side view, an LCD display having a front polarizer, a rear polarizer, a reflective polarizing color filter array shown in each of two possible arrangements, and an absorptive color filter array, showing light behavior for dark and light state pixels.
Figure 4C:
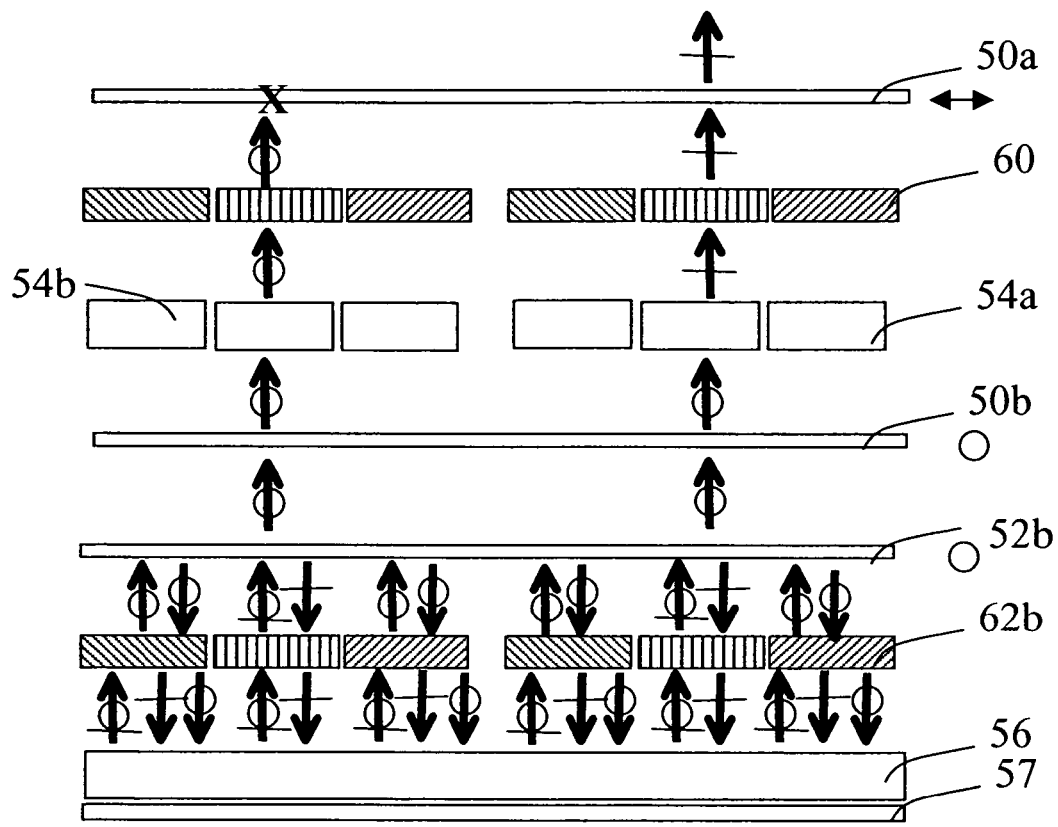
Figure 5A:
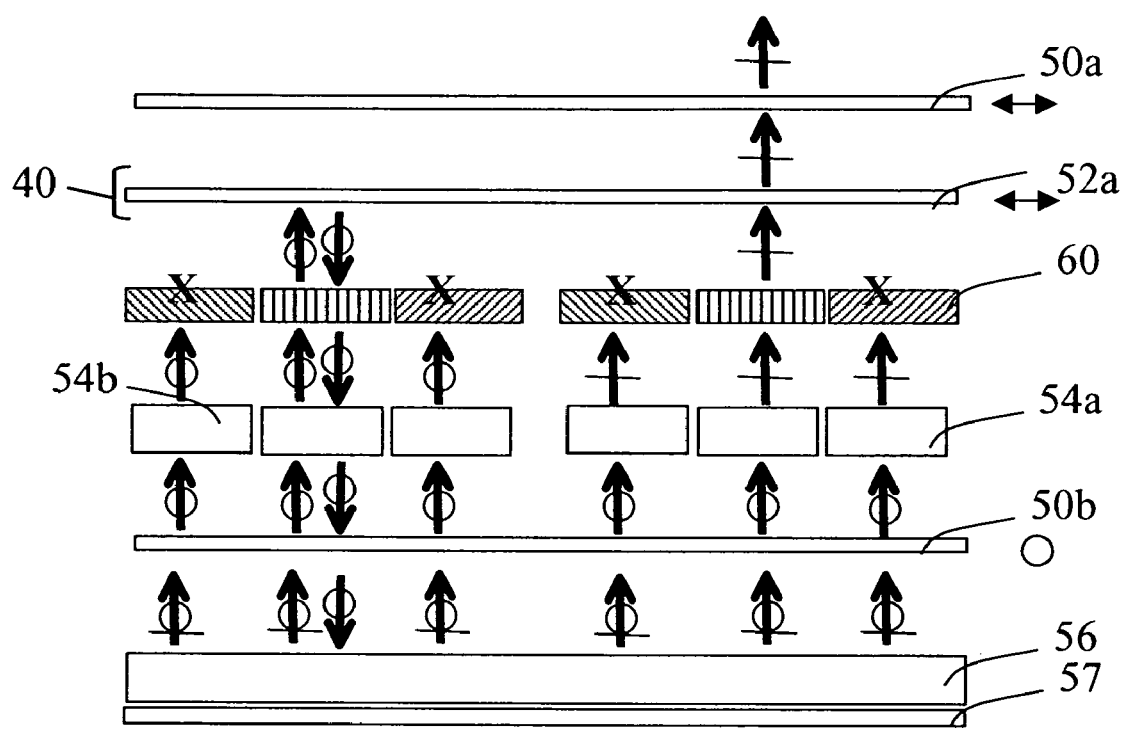
FIG. 5A is a schematic diagram showing, from a cross-sectional side view, an embodiment of the LCD display of the present invention having a front polarizer, a rear polarizer, a reflective polarizer, and an absorptive color filter array, showing light behavior for dark and light state pixels.
Figure 5B:
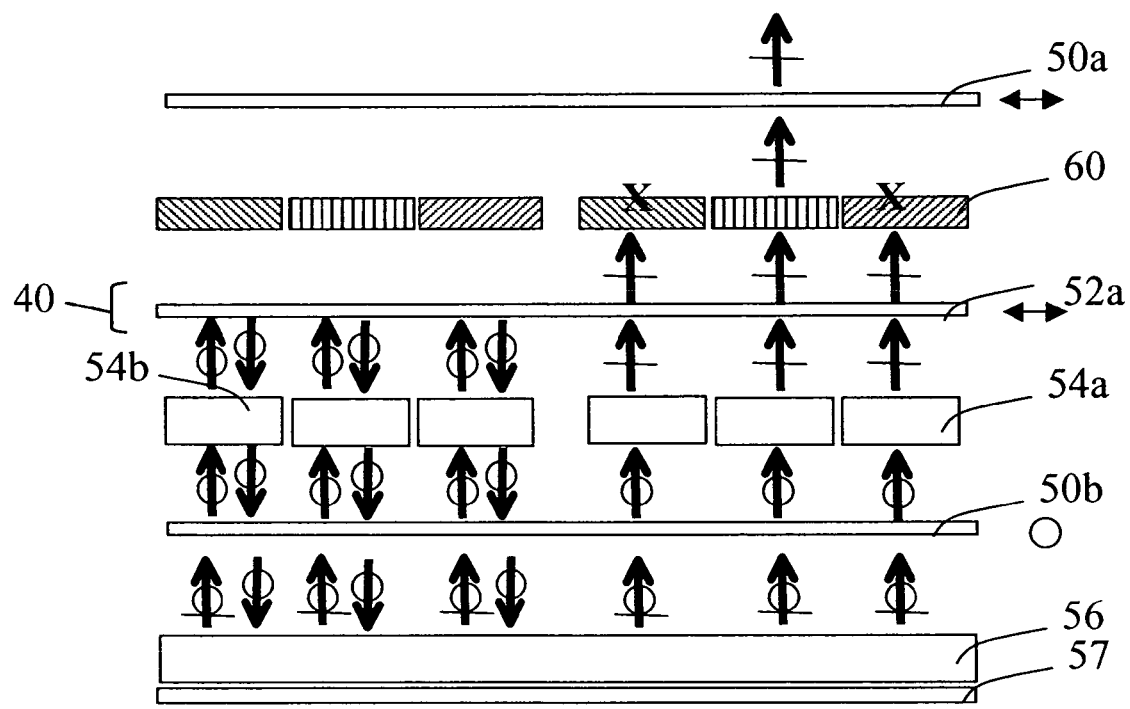
FIG. 5B is a schematic diagram showing, from a cross-sectional side view, an embodiment of the LCD display of the present invention having a front polarizer, a rear polarizer, a reflective polarizer, and an absorptive color filter array, showing light behavior for dark and light state pixels.

Referring to FIGS. 5A and 5B, there are shown variations of a first embodiment of the present invention for an LCD display 20. Following the pattern used in FIGS. 1-4C, FIGS. 5A, 5B and subsequent figures showing embodiments of the present invention show a dark state pixel at the left and a light state pixel on the right.

Figure 11:
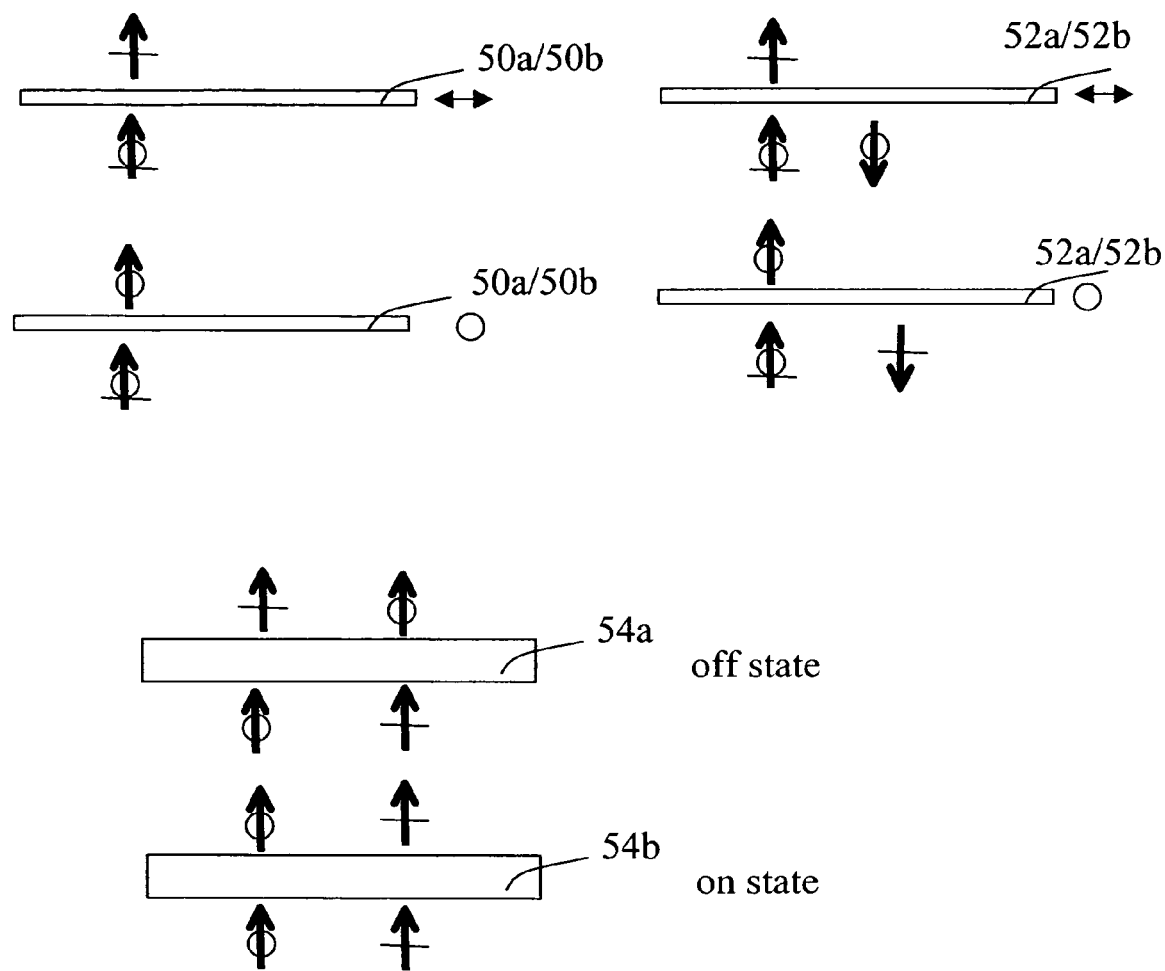
FIG. 11 is a set of cross-sectional side views showing the nomenclature, symbols, and behavior for components of the present invention.

In FIGS. 5A and 5B, LCD display 20 has a reflective polarizer 52*a* that serves as a reflective polarizing element 40 disposed between LC component 54*a*/54*b* and front polarizer 50*a*. In addition, absorptive color filter array 60 is provided, disposed adjacently to front reflective polarizer 52*a*, either between front reflective polarizer 52*a* and LC component 54a/54b, as in FIG. 5A, or between front reflective polarizer 52a and front polarizer 50a, as in FIG. 5B. Here, and as shown in subsequent embodiments, the transmission axes of rear and front polarizers 50b and 50a can be perpendicular to within ±10 degrees of each other, that is, with one rotated to within 80 to 100 degrees relative to the other. Here, and as shown in subsequent embodiments, the transmission axis of reflective polarizer 52a can be parallel to the transmission axis of front polarizer 50a, to within at least about ±10 degrees of each other. Alternate angular arrangements for these transmission axes are also possible, including configurations wherein the transmission axes of rear and front polarizers 50b and 50a are parallel to within ±10 degrees of each other. Following the convention described with reference to FIG. 11, the LC component 54a off state converts P-polarization to S-polarization, and S- to P-polarization. The transmission axis of reflective polarizer 52a is parallel to the transmission axis of absorptive front polarizer 50a. Recycled light from reflective polarizer 52a has an orthogonal polarization with respect to front polarizer 50a.

In the light state, unpolarized light from backlight unit 56 is incident to rear polarizer 50b that transmits light having S-polarization, absorbing the P-polarization component. Off state LC component 54a rotates the light polarization to provide output light having P-polarization. This light is then transmitted through both reflective polarizer 52a and absorptive color filter array 60, then through front polarizer 50a. Thus, in the light state, reflective polarizer 52a simply transmits the intended light.

The positioning of absorptive color filter array 60 relative to reflective polarizing element 40 has an effect on the available brightness. In the position shown in FIG. 5A, in the dark state path at the left, light from on state LC component 54b is transmitted through absorptive color filter array 60 and is reflected back from reflective polarizer 52a, transmitted in its return through absorptive color filter array 60, and directed back for recycling. Light that is out of the passband is absorbed by the absorptive color filter array and cannot be recycled by front reflective polarizer 52a. In addition, because the transmittivity of absorptive color filter array 60 is imperfect, there is also some loss with each passage of the light, even at the passband wavelengths. By comparison, the arrangement of FIG. 5B shows the relative positions of reflective polarizing element 40 and absorptive color filter array components interchanged. In the arrangement of FIG. 5B, light from on state LC component 54b is reflected back from front reflective polarizer 52a before it can reach absorptive color filter array 60. Thus, the arrangement of FIG. 5B increases available brightness over the arrangement of FIG. 5A by about $$\frac{1-\frac{x}{6}}{1-\frac{x}{2}}-1,$$

where x is the percentage of dark pixels. When the percentage of dark pixels x approaches 100%, the arrangement of FIG. 5B increases available brightness over the arrangement of FIG. 5A by about 67%.

In either the FIG. 5A or 5B arrangement, reflective polarizer 52a reflects any light having S-polarization back toward backlight unit 56. This behavior has a recycling effect, allowing this dark state light to be reused for light state pixels. By comparison with the conventional arrangement shown in FIGS. 1 and 2, the novel arrangements of FIGS. 5A and 5B allow a measure of increased brightness.

COMPARATIVE EXAMPLE

Figure 6:
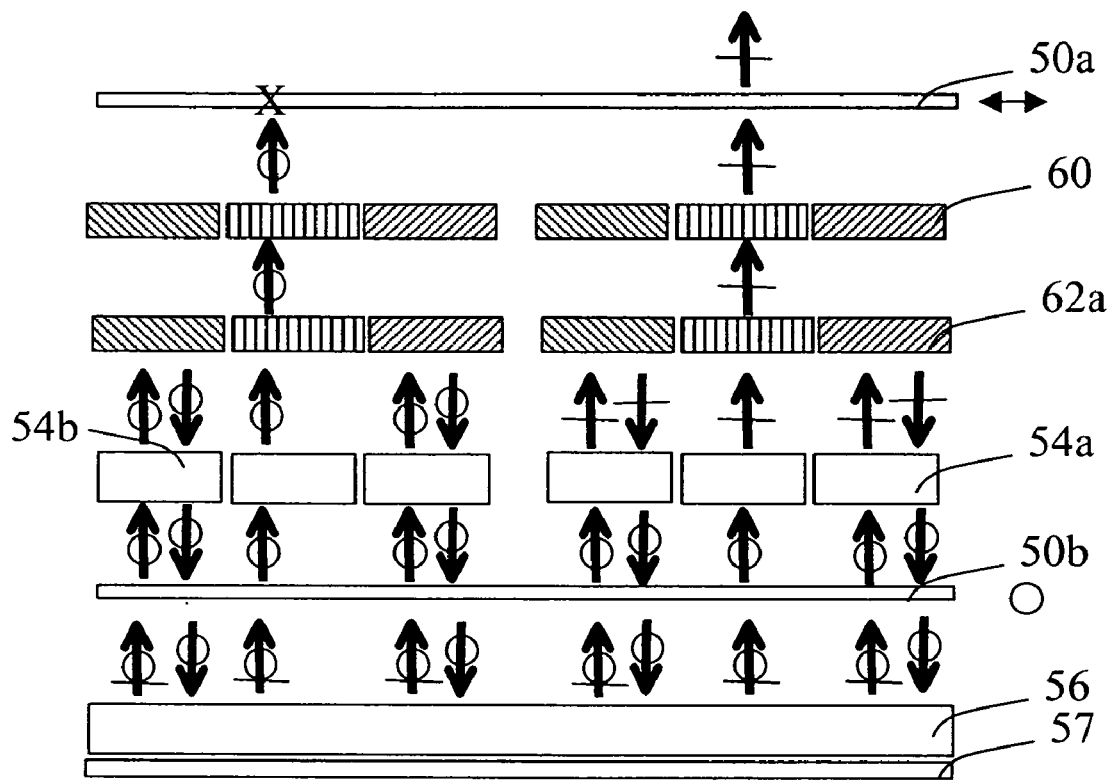
FIG. 6 is a schematic diagram showing, from a cross-sectional side view, a comparative example of an LCD display having a front polarizer, a rear polarizer, a reflective color filter array, and an absorptive color filter array, showing light behavior for dark and light state pixels.

Referring to FIG. 6, there is shown a possible configuration of LCD display 20 using a reflective color filter array 62a in conjunction with conventional absorptive color filter array 60. In this comparative example, the reflective color filter array 62a is placed at the same location as the reflective polarizer 52a as shown in FIG. 5B, that is, between LC components 54a/54b and color filter array 60. This configuration may provide increased light output, as can be appreciated by comparison with the conventional arrangement of FIG. 1. However, in a dark state pixel, light transmitted through LC component 54b, reflective color filter array 62a, and absorptive color filter array 60 is eventually absorbed by front polarizer 50a. This example, then, shows no dark state light recycling effects.

SECOND EMBODIMENT

Figure 7A:
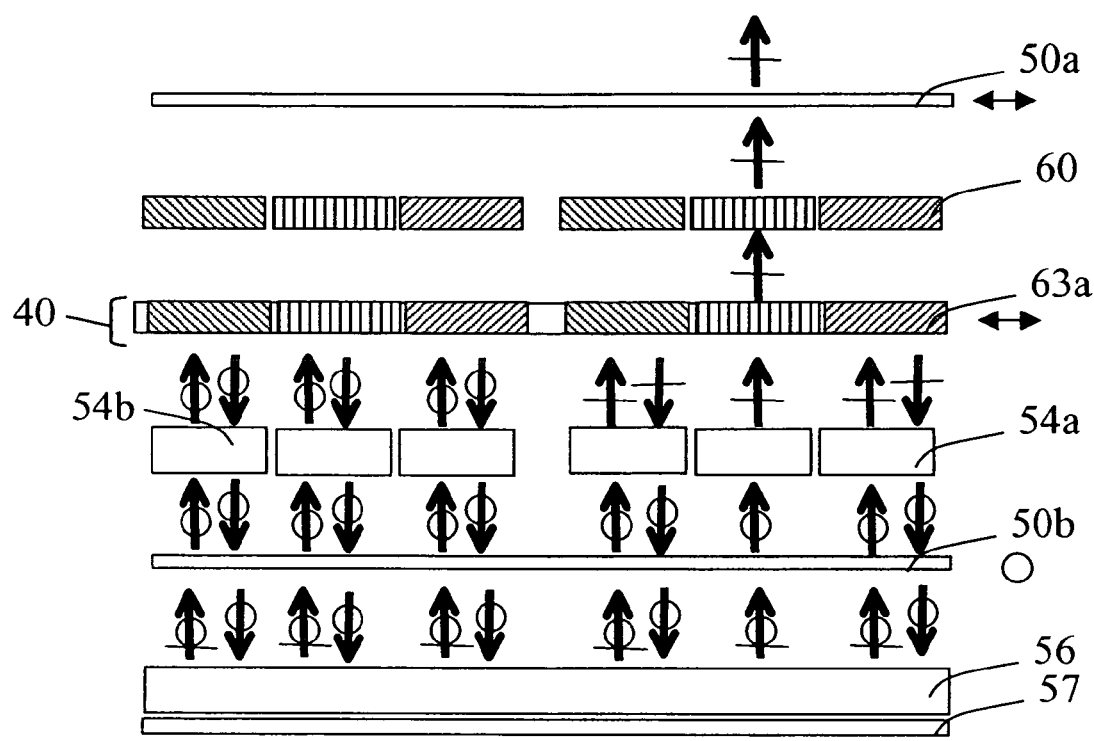
FIGS. 7A, 7B, and 7C are schematic diagrams showing, from a cross-sectional side view, embodiments of the LCD display of the present invention having a front polarizer, a rear polarizer, a reflective polarizing color filter array comprising a reflective polarizer and a reflective color filter array, and an absorptive color filter array, showing light behavior for dark and light state pixels.
Figure 7B:
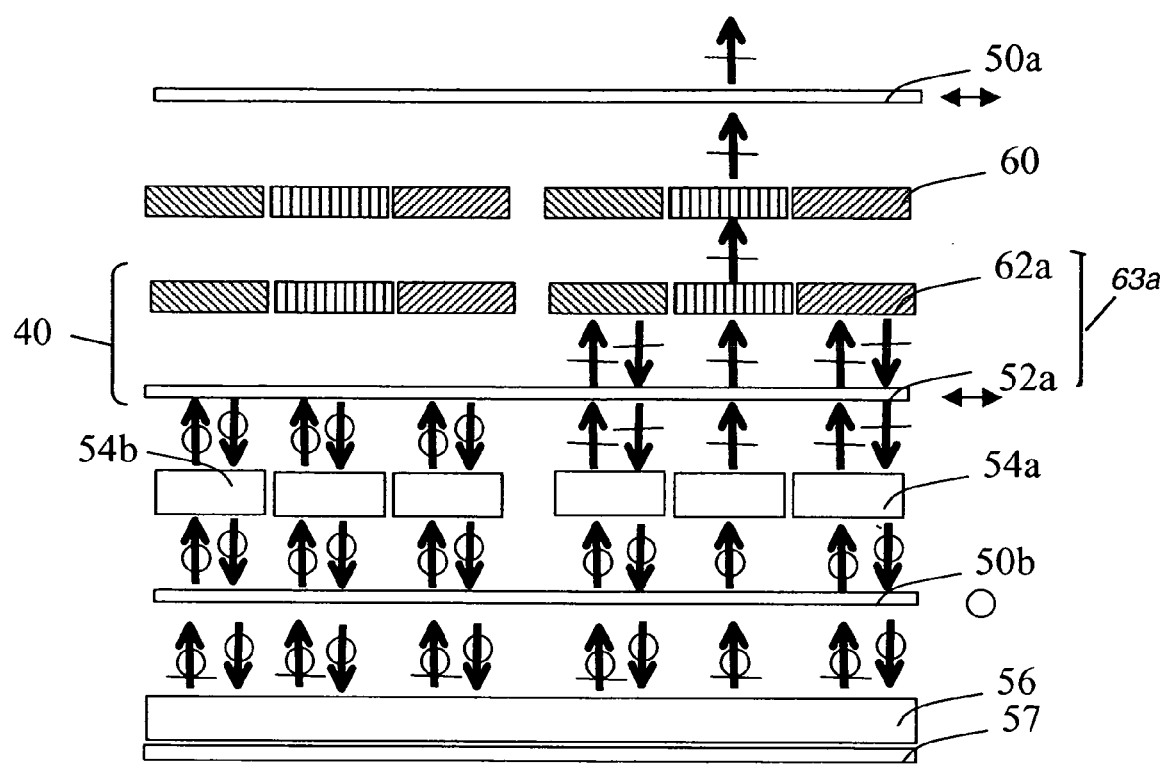
Figure 7C:
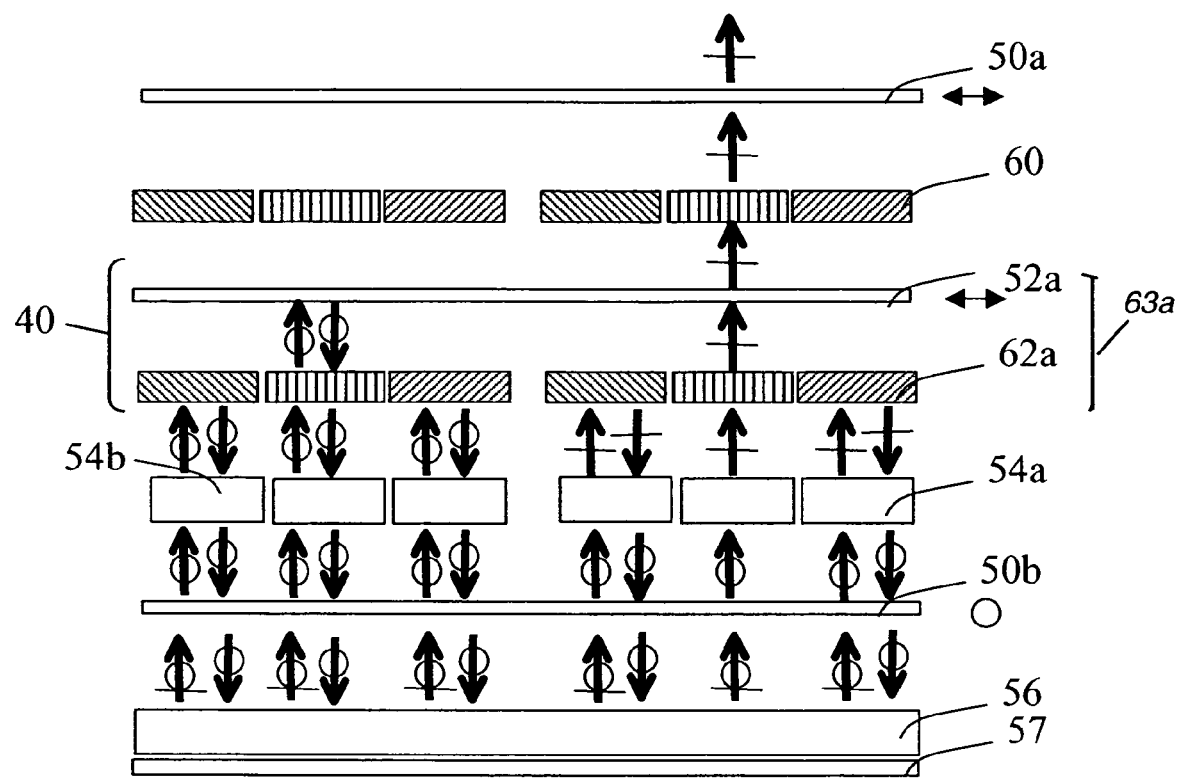

Referring to FIGS. 7A, 7B, and 7C, there are shown variations of another embodiment of the present invention, in which a reflective polarizing color filter array 63a functions as reflective polarizing element 40. Reflective polarizing color filter 63a is disposed between LC component 54a/54b and absorptive color filter array 60 and front polarizer 50a. These various arrangements have been shown to provide brightness increases of up to three times the brightness of conventional configurations when the percentage of dark pixels x approaches 100%. In FIG. 7A, reflective polarizing color filter array 63a is shown as a single component providing color filter, polarization, and reflective properties, as was described in the Wegh et al. article cited above. Positioned before absorptive color filter array 60 in the light path, reflective polarizing color filter array 63a recycles the dark state light and minimizes the amount of light that must be absorbed by absorptive color filter array 60.

As is shown in FIGS. 7B and 7C, reflective polarizing color filter array 63a can be formed by combining a reflective polarizer 52a component and a reflective color filter array 62a component, one atop the other in the two possible layered sequences shown.

THIRD EMBODIMENT

Figure 8A:
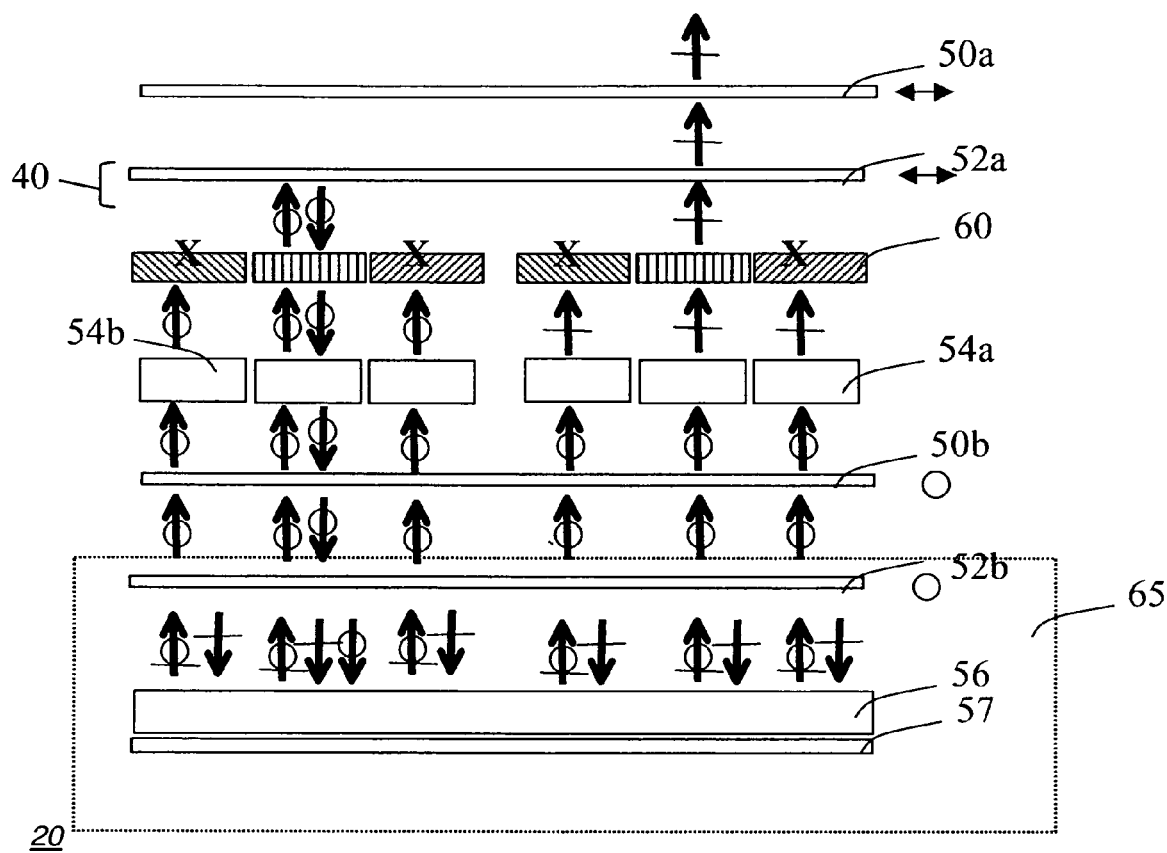
FIGS. 8A and 8B are schematic diagrams showing, from a cross-sectional side view, embodiments of the LCD display of the present invention having a front polarizer, a rear polarizer, a pair of reflective polarizers, and an absorptive color filter array, showing light behavior for dark and light state pixels.
Figure 8B:
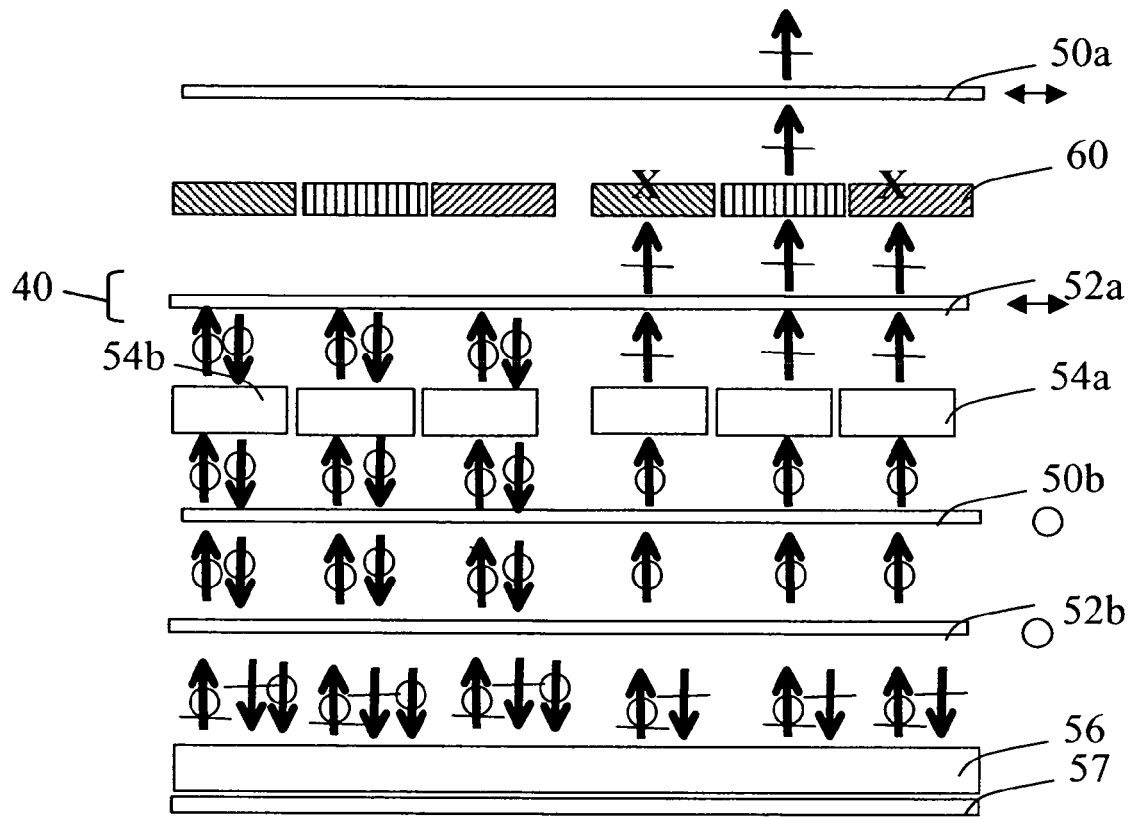

Referring to FIGS. 8A and 8B, there are shown two possible arrangements for absorptive color filter array 60 and paired front and rear reflective polarizers 52a and 52b in an embodiment of the present invention. Here, front reflective polarizer 52a serves as reflective polarizing element 40. The arrangement of FIG. 8A provides some additional brightness over the arrangement of FIG. 5A because rear reflective polarizer 52b recycles light that is otherwise absorbed by rear polarizer 50b However, only about one third of light that passes through absorptive color filter array 60 can be recycled by front reflective polarizer 52a. In addition, the portion of the recycled light is transmitted through absorptive color filter array 60 twice, with consequent loss due to imperfect transmittivity, as was noted earlier. The arrangement of FIG. 8B, on the other hand, is advantaged over that of FIG. 8A. Positioned before absorptive color filter array 60 in the output light path, reflective polarizer 52a recycles dark state light back through on-state LC component 54b more efficiently, before this light reaches absorptive color filter array 60.

It is instructive to follow the light handling behavior shown in FIGS. 8A and 8B. Unpolarized light from backlight unit 56 is incident to rear reflective polarizer 52b that transmits one polarization (S-polarization in FIGS. 8A and 8B), thereby providing linearly polarized light, and reflects the orthogonal polarization back to backlight unit 56 for recycling. Rear polarizer 50b transmits light having S-polarization, absorbing any residual P-polarization component. On state LC component 54b performs no rotation of light polarization. Absorptive color filter array 60 selectively transmits and absorbs the light according to wavelength. Front reflective polarizer 52a then reflects light having S-polarization back toward backlight unit 56. This behavior has a recycling effect, allowing this light (through dark state pixels) to be reused for light state pixels. Off state LC component 54a rotates the light polarization to provide output light having P-polarization. Absorptive color filter array 60 selectively transmits and absorbs the light according to wavelength. The transmitted light is then transmitted through both reflective polarizer 52a and front polarizer 50a.

FOURTH EMBODIMENT

Figure 9A:
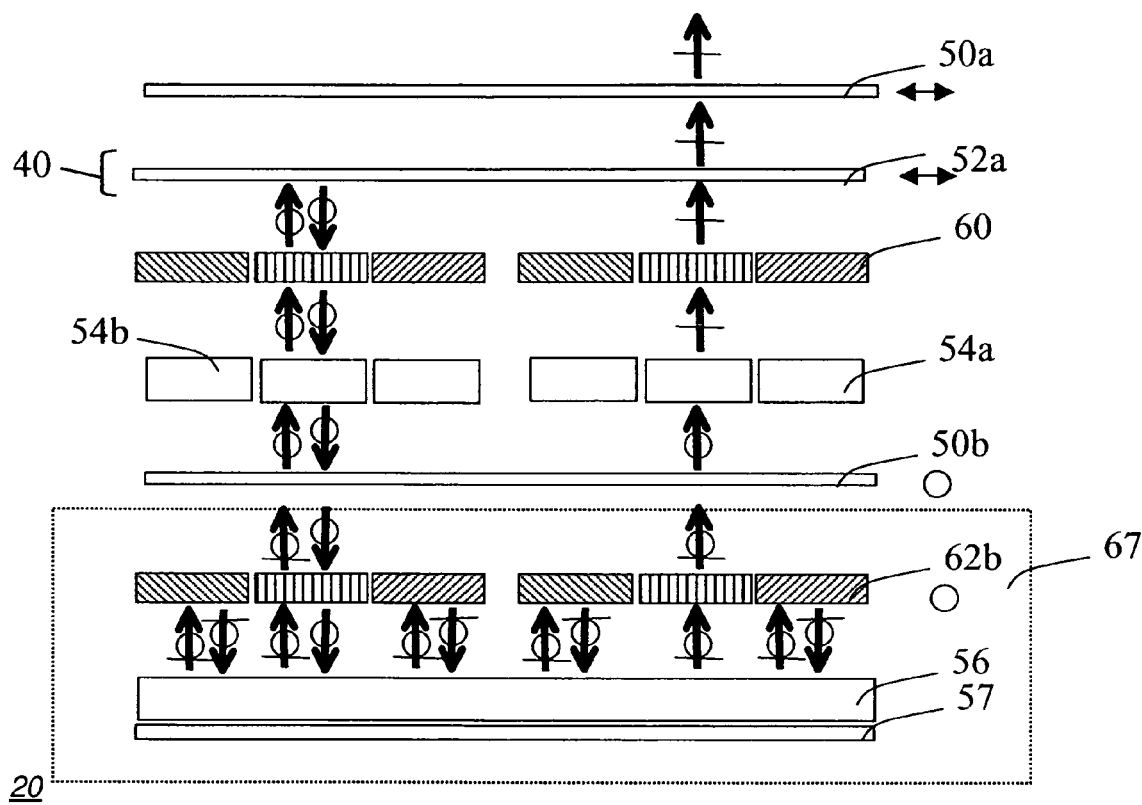
FIGS. 9A and 9B are schematic diagrams showing, from a cross-sectional side view, embodiments of the LCD display of the present invention having a front polarizer, a rear polarizer, a reflective polarizer, a reflective color filter array, and an absorptive color filter array, showing light behavior for dark and light state pixels.
Figure 9B:
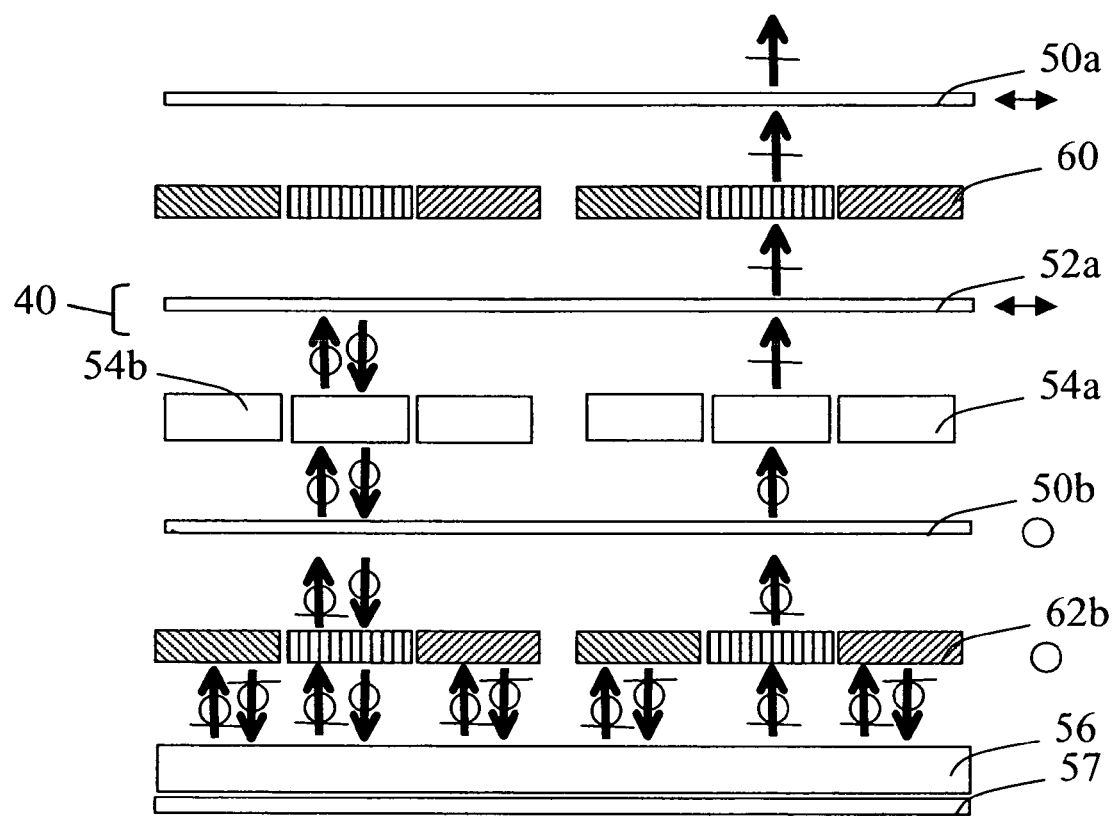

Referring to FIGS. 9A and 9B, there are shown two possible arrangements for color filter array 60 and reflective polarizer 52a. In both embodiments shown, front reflective polarizer 52a again serves as reflective polarizing element 40. The light handling operation for each of these embodiments, component to component, parallels that described for embodiments described above, with appropriate changes due to differences in configuration.

For either of the two configurations of FIGS. 9A and 9B, a significant brightness gain is possible because high levels of dark state light recycled by reflective polarizer 52a are not absorbed by absorptive color filter array 60. In both FIGS. 9A and 9B, reflective color filter array 62b is disposed adjacent to backlight unit 56 in the sequence, to reflect back a portion of unusable light for recycling.

FIFTH EMBODIMENT

Figure 10A:
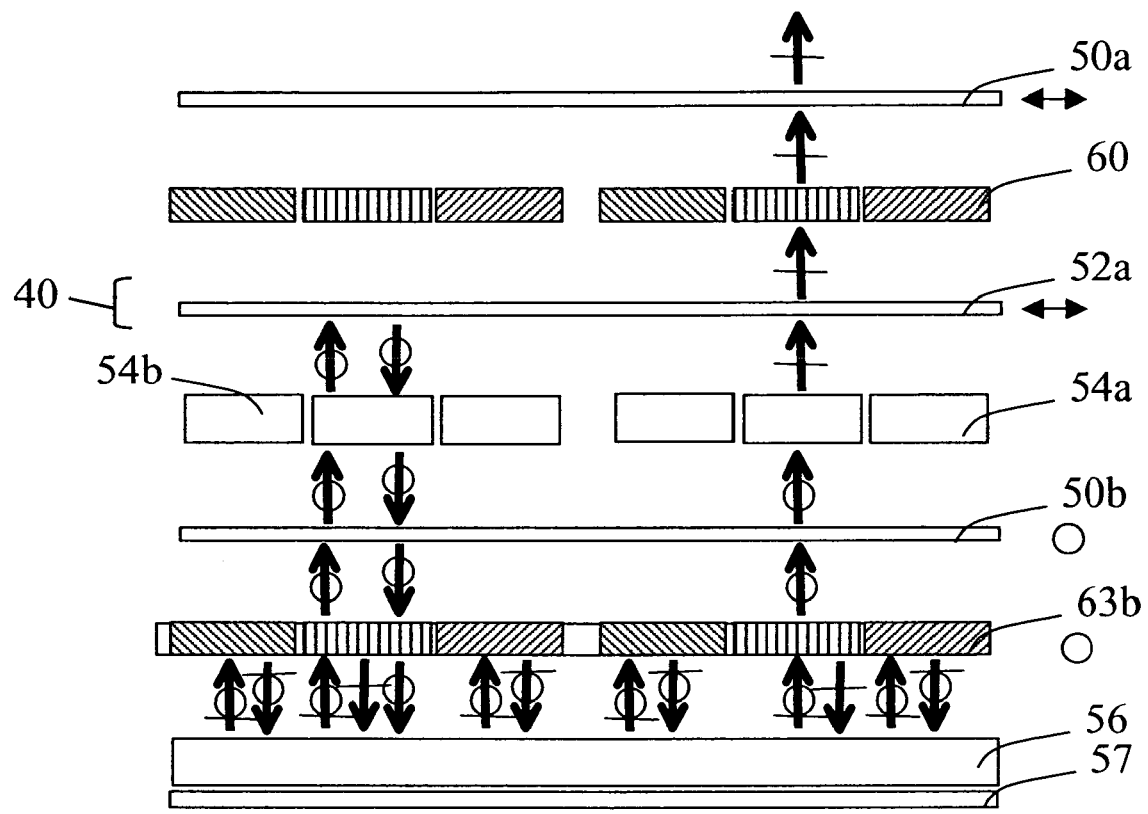
FIGS. 10A, 10B, 10C, and 10D are schematic diagrams showing, from a cross-sectional side view, embodiments of the LCD display of the present invention having a front polarizer, a rear polarizer, a reflective polarizer, an absorptive color filter array, and a reflective polarizing color filter array in two possible arrangements, showing light behavior for dark and light state pixels.
Figure 10B:
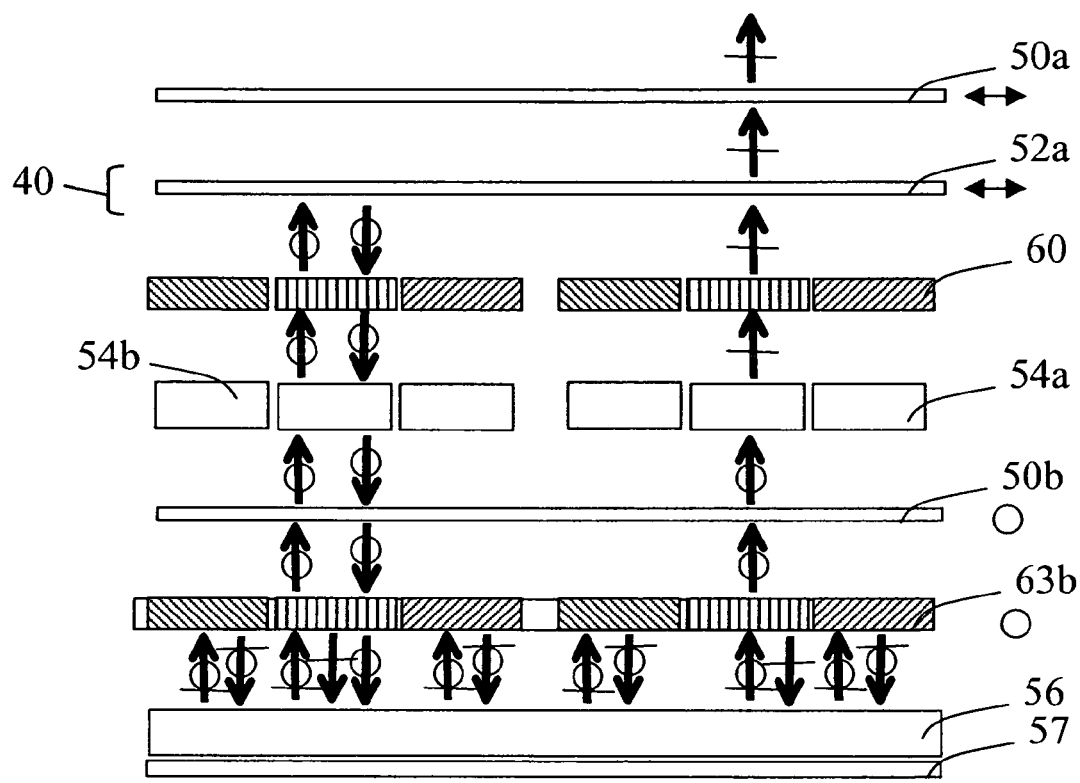

Referring to FIGS. 10A-10D, possible arrangements for yet another embodiment are shown, in which front reflective polarizer 52a, functioning as reflective polarizing element 40, is used in conjunction with rear reflective polarizing color filter array 63b. In FIGS. 10A and 10B, the relative positions of absorptive color filter array 60 and front reflective polarizer 52a are shown in two possible arrangements. Following the reasoning given for preceding embodiments, it can be appreciated that the embodiment of FIG. 10A is advantaged over that of FIG. 10B for dark state light recycling. Reflective polarization color filter array 63b is disposed adjacent to backlight unit 56, to reflect back, for recycling, light having unwanted P-polarization and light having other than the desired color.

Figure 10C:
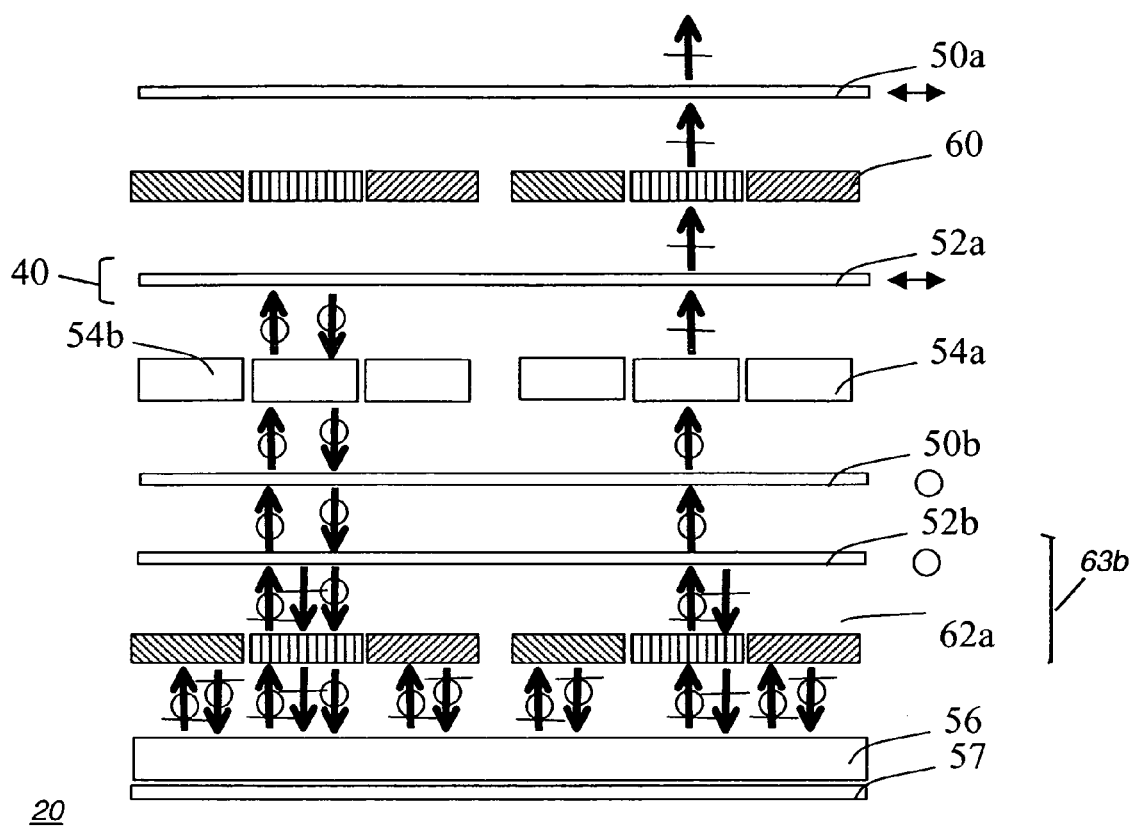
Figure 10D:
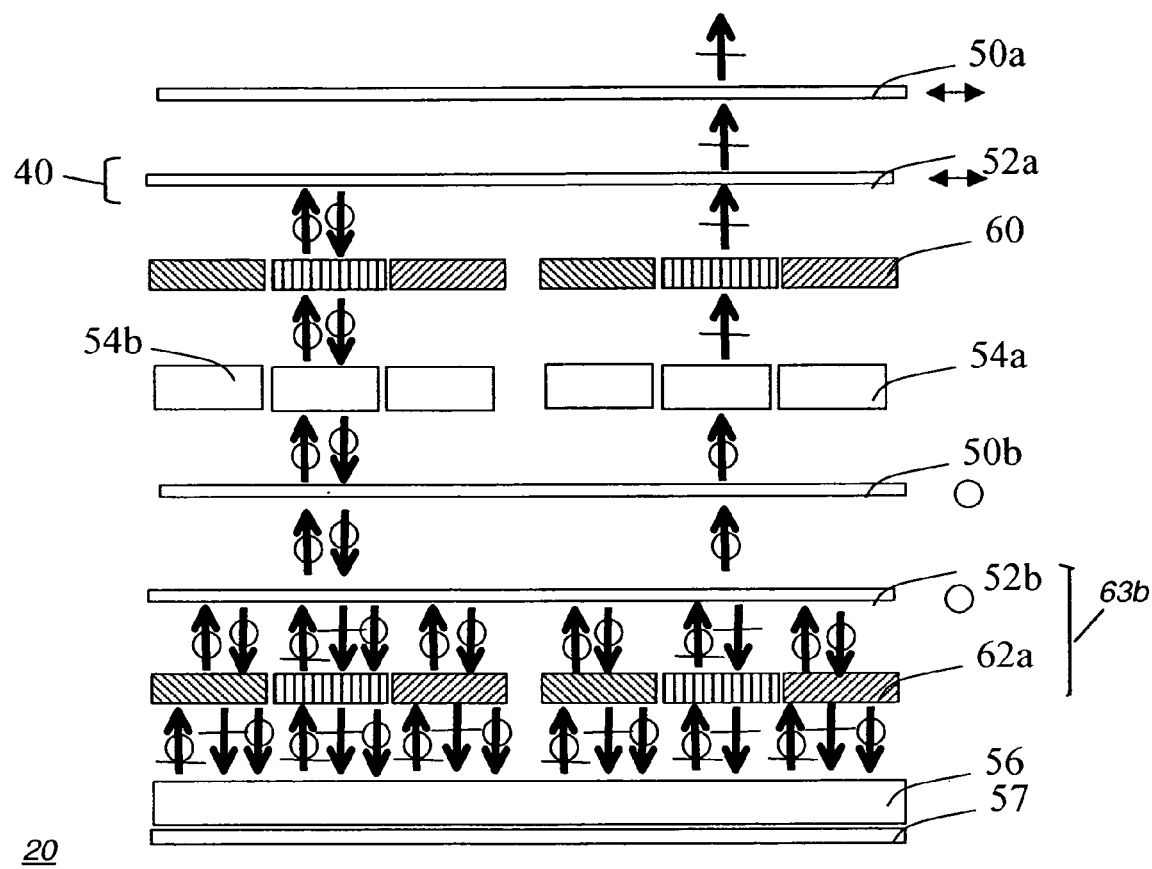

As shown in FIGS. 10C and 10D, reflective polarizing color filter array 63b can be represented as a composite film having both a reflective polarizer 52a component and a reflective color filter array 62a component, one atop the other, in each of the possible configurations shown. For either of these four configurations, a significant brightness gain is possible over conventional arrangements, because dark state light is recycled by reflective polarizer 52a.

SIXTH EMBODIMENT

Referring again to FIGS. 7A, 7B, and 7C, reflective polarizing color filter array 63a or a combination of both reflective polarizer 52a and reflective color filter array 62a provide increased brightness by recycling dark state light. However, during dark state light recycling, unpolarized light must be transmitted through rear polarizer 50b resulting light loss, which limits recycling efficiency. Further brightness increases can be achieved by adding an additional reflective polarizer 52b between rear polarizer 50b and backlight unit 56. In the event that reflective color filter array 62a performance is imperfect, this additional reflective polarizer 52b can be replaced with reflective color filter array 62b or with reflective polarizing color filter array 63b to further enhance brightness.

SEVENTH EMBODIMENT

In the third embodiment of FIGS. 8A, 8B and sixth embodiment of FIGS. 7A, 7B, and 7C, reflective polarizer 52b and backlight unit 56 can be replaced with any known linearly polarized backlight unit 65, as indicated by a dashed box in FIG. 8A. Linearly polarized backlight unit 65 emits polarized light, such as that disclosed in the article entitled "Micro-structured Polymeric Linearly Polarized Light Emitting Lightguide for LCD Illumination" by H. J. B. Jagt, H. J. Cornelissen, and D. J. Broer in SID 02 Digest pp. 1236-1239 which describes an alternative design for a linearly polarized light guide. The use of linearly polarized backlight unit 65 in place of backlight unit 56 could obviate the need for a separate rear polarizer 50b and/or rear reflective polarizer 52b in many LC display applications.

EIGHTH EMBODIMENT

In the fourth embodiment of FIGS. 9A, 9B and sixth embodiment of FIGS. 7A, 7B, and 7C, reflective color filter array 62b and backlight unit 56, which emits white light, can be replaced with any known color separation backlight unit 67 (shown by a dashed box in FIG. 9A). Color separation backlight unit 67 separates red, green and blue light and directs red light to red color filter, green to green color filter, and blue to blue color filter. One type of color separation backlight unit 67 is disclosed in the article entitled "Low-power LCD using a novel optical system" by Y. Taira et al. in SID 02 Digest pp. 1313-1315. This device could be particularly advantageous for reducing the number of components needed for dark state light recycling. The Taira et al. article describes an alternative design for a color separated light guide. The use of such a light guide as backlight unit 56 could obviate the need for a separate rear reflective color filter array 62a in many LC display applications.

LCD System

Figure 19:
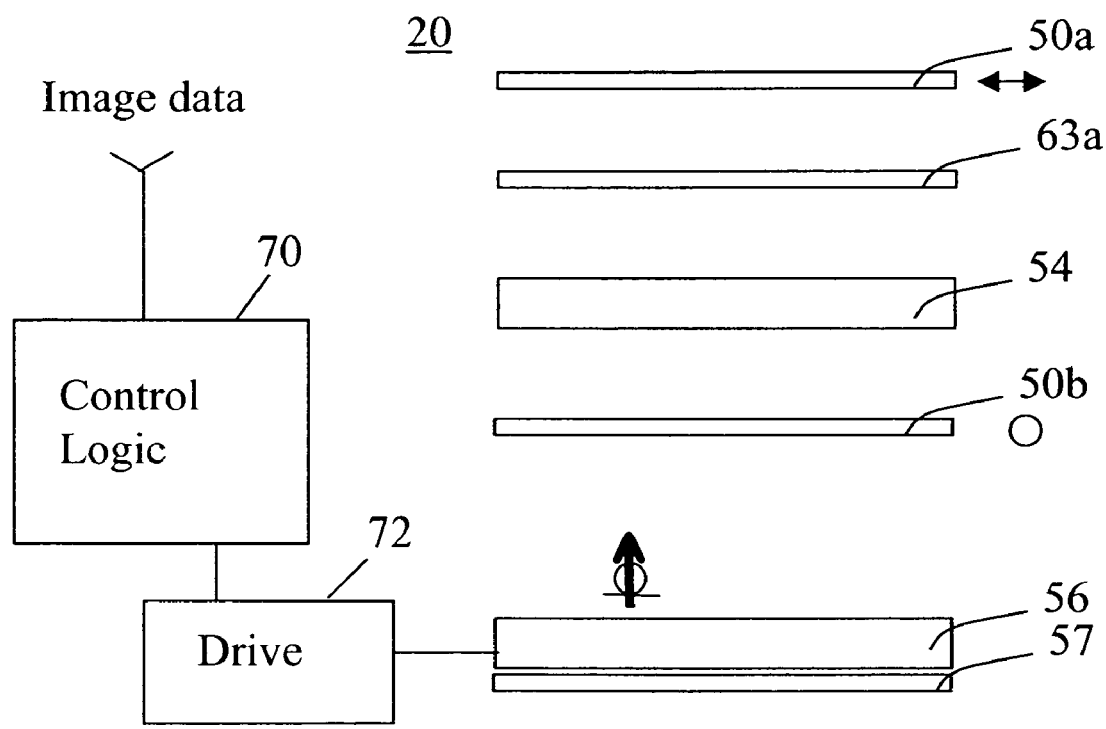
FIG. 19 shows a schematic block diagram of components used for brightness control in one embodiment; and, FIG. 20 shows a flow chart of the logic used to adapt backlighting unit brightness based on overall image brightness.

Recycling dark state light according to the present invention provides the light state pixels of the LCD with more light than the same pixels would receive for a conventional display without dark state light recycling. The LCD can be of any type known in the art. As is noted in the description given above, the incremental amount of added brightness depends, in part, on the percentage x of dark pixels. In some cases, it may be preferable to maintain a consistent level of pixel brightness for a given pixel data value, regardless of the percentage x of dark pixels. The present invention also provides an apparatus and method for maintaining this consistent brightness behavior by dynamically adjusting the source brightness of backlight unit 56 based on the percentage x of dark pixels. Referring to the block diagram of FIG. 19, there are shown the additional components provided for brightness control. A control logic processor 70 receives the image data and calculates the percentage x of dark pixels.

Based on this calculation, control logic processor 70 modulates the signal to a drive circuit 72 that provides a variable signal to backlight unit 56. The light source for backlight unit 56 may be a light emitting diode (LED), an array of LEDs, or some other type of light source having sufficiently fast intensity response to a changing drive signal. A liquid crystal spatial light modulator-54 acts as the spatial light modulator, forming a modulated beam by modulating its array of off-state and on-state components 54a and 54b.

Figure 20:
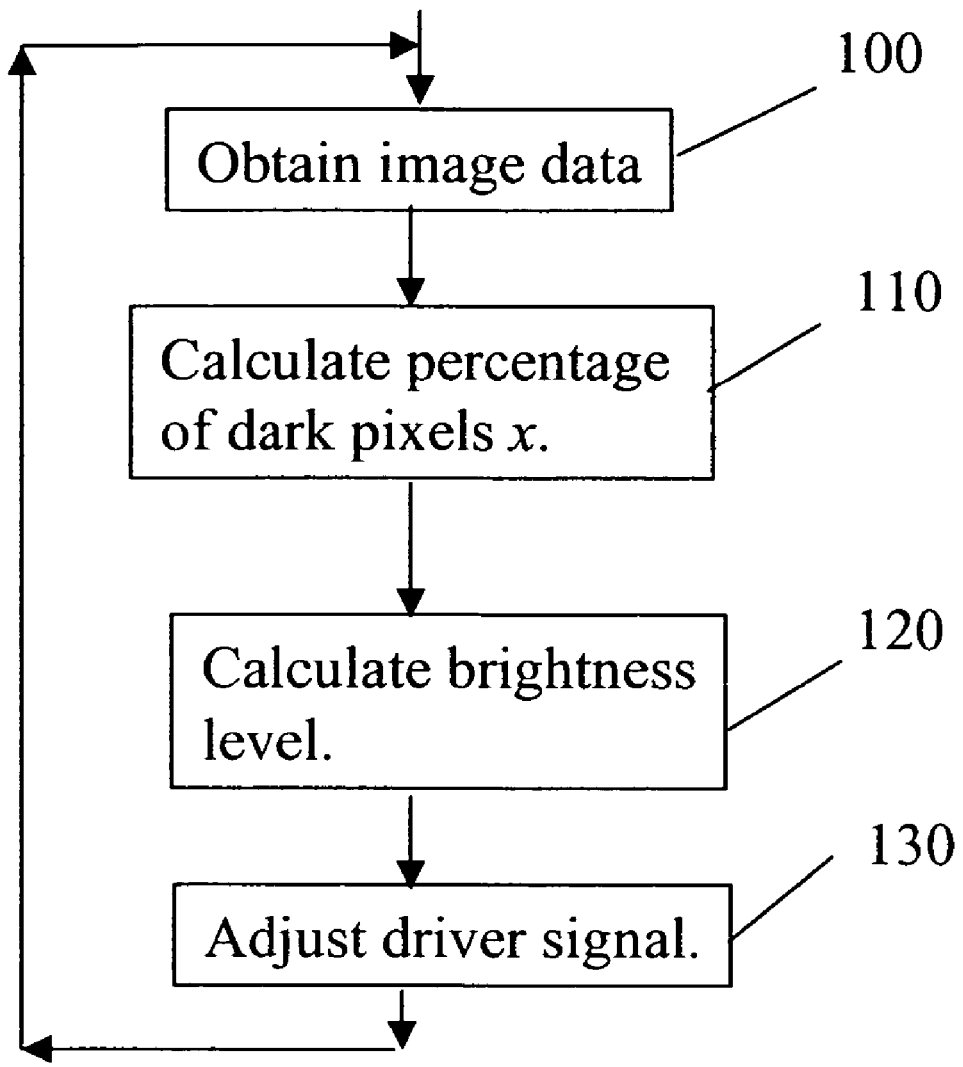

The control logic for brightness adjustment is straightforward, as is shown in the example block diagram of FIG. 20. For each image, image data is accessed in an obtain data step 100. A dark percentage calculation step 110 is then executed, in which percentage x of dark pixels from the modulated beam is calculated from this data. Based on this calculation a brightness level calculation step 120 is executed, in which control logic computes a new brightness level applied for light state pixels, using an equation or using a look-up table, for example. Based on this calculated drive value, a drive signal adjustment step 130 is executed, directing this value to drive circuit 62, as an analog or digital signal. The control logic of FIG. 20 can be used for an individual image or used as a control loop, repeated for each of a succession of images.

Reflective Polarizer Types

The apparatus and method of the present invention can use a number of different types of reflective polarizer, including a wire-grid polarizer (available from Moxtek, Inc., Orem, Utah), a cholesteric liquid crystal component with a quarter-wave retarder, or a multilayer interference-based polarizer such as Vikuiti™ Dual Brightness Enhancement Film, manufactured by 3M, St. Paul, Minn. In the wire-grid polarizer, thin wires are formed on a glass substrate. Wires can be faced toward the liquid crystal layer, functioning as electrode, alignment, and reflective polarizer. Wires can also be faced toward the front polarizer. Other known reflective polarizers can also be used.

For best performance, reflective polarizers should present as little retardance as possible, so as not to cause adverse effects to either light or dark state pixels. If there is retardance, the optical axis of the substrate is best arranged either parallel or perpendicular to the transmission axis of the reflective polarizer. It is also possible to incorporate a compensation film as known in the art to improve viewing angle, contrast, and color purity of the reflective polarizers. A compensation film could be an integral component of or an added component to reflective polarizing element 40, affixed or otherwise coupled to reflective polarizing element 40.

For the embodiments disclosed herein, additional components may be added to enhance brightness and contrast. For example, any known collimating films such as conventional brightness enhancement film Vikuiti™ Brightness Enhancement Film, manufactured by 3M, St. Paul, Minn. could be added to collimate the illumination. A brightness enhancement film for this purpose would be added to the configuration of FIGS. 5A-10D, disposed near backlight unit 56.

As described for the embodiments disclosed herein, reflective polarizing element 40 can be formed from a reflective polarizer 52a, as shown in FIGS. 5A-5B, 8A-8B, 9A-9B, and 10A-10D, or from a reflective polarization color filter array 63a, as shown in FIGS. 7A-7C. Reflective polarizing element 40, disposed between liquid crystal spatial light modulator 54 and front polarizer 50a, helps to improve the brightness of light state display pixels 54a by recycling unwanted light from dark state pixels 54b. The reflective polarizing element may be coupled to the surface of the liquid crystal spatial light modulator. Additionally, the color filter array may be coupled to the surface of the liquid crystal spatial light modulator.

It can be appreciated that there is potential brightness loss when adding optical components for handling illumination or modulated light beams. In order to yield sufficient brightness increase to offset inherent losses at each optical component, it is useful to establish some performance criteria. It has been found, for example, that, for reflective polarizing element 40, transmittance T of at least 0.75 (75%) or better is a particularly suitable range.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, light state and dark state behaviors of LC spatial light modulators can be reversed. The use of reflective polarizer 52a between front and rear polarizers 50a and 50b necessitates some changes to the design of these other polarizing components, as can be well appreciated by those skilled in the optical arts. Reflective polarizer 52a can alternately be incorporated onto the surface of LC component 52a/52b, so that the spatial light modulator itself includes this reflective polarization component.

While components of LC display 20 are shown schematically in separate layers, it is often desirable to adhere or otherwise couple one component directly to another, depending on the optical requirements. For example, rear polarizer 50b, reflective polarizer 52b, or reflective polarization color filter array 63a or 63b may be affixed directly to the surface of backlight unit 56, thereby providing one type of linearly polarized light guide.

A linearly polarized light guide could be used, such as that disclosed in the article entitled "Micro-structured Polymeric Linearly Polarized Light Emitting Lightguide for LCD Illumination" by H. J. B. Jagt, H. J. Cornelissen, and D. J. Broer in *SID 02 Digest* pp. 1236-1239. The Jagt et al. article describes an alternative design for a linearly polarized light guide. The use of such a light guide as backlight unit 56 could obviate the need for a separate rear polarizer 50b and/or rear reflective polarizer 52b in many LC display applications.

A color separated light guide, such as that disclosed in the article entitled "Low-power LCD using a novel optical system" by Y. Taira et al. in *SID 02 Digest* pp. 1313-1315 could be particularly advantageous for reducing the number of components needed for dark state light recycling. The Taira et al. article describes an alternative design for a color separated light guide. The use of such a light guide as backlight unit 56 could obviate the need for a separate rear reflective color filter array 62a in many LC display applications.

A reflective color filter can be a thin film optical interference filter with alternating structures such as $TiO_2/SiO_2$, as discussed in the article entitled "Design issues in using thin-film optical intereference filters as color filters for LCD system applications" by S-F. Chen and H-P. D. Shieh in *SID 1994 Digest* pp. 411-416.

Thus, what is disclosed is an LCD display using a reflective polarizer in cooperation with a color filter array to recycle dark state light, providing improved efficiency and brightness.

| PARTS LIST | |
|---|---|
| 10 | LCD display |
| 12 | Light pixel |
| 14 | Dark pixel |
| 20 | LCD display |
| 40 | Reflective polarizing element |
| 50a | Front absorptive polarizer |
| 50b | Rear absorptive polarizer |
| 52a | Reflective polarizer |
| 52b | Reflective polarizer |
| 54 | Liquid crystal spatial light modulator |
| 54a | Off state LC component |
| 54b | On state LC component |
| 56 | Backlight unit |
| 57 | Reflective film |
| 60 | Absorptive color filter array (CFA) |
| 62a, 62b | Reflective color filter array |
| 63a, 63b | Reflective polarization color filter array |
| 65 | Linearly polarized backlight unit |
| 67 | Color separation backlight unit |
| 70 | Control logic processor |
| 72 | Drive circuit |
| 100 | Obtain data step |
| 110 | Dark percentage calculation step |
| 120 | Brightness level calculation step |
| 130 | Drive signal adjustment step |

The invention claimed is:

1. A method of adjusting display brightness comprising operating a liquid crystal comprising in order (a) a backlight unit for providing illumination;

(b) a rear absorptive polarizer disposed proximate the backlight unit for receiving the incident illumination and transmitting substantially polarized illumination;

(c) a liquid crystal spatial light modulator for forming a modulated beam by selective, pixel-wise modulation of the polarization of the substantially polarized illumination;

(d) an absorptive color filter array for transmitting selected wavelengths of the modulated beam from the LC spatial light modulator;

(e) a front absorptive polarizer having a transmission axis for transmitting the portion of the modulated beam having a polarization in alignment with the transmission axis; and, (f) a reflective polarizing element disposed between the liquid crystal spatial light modulator (c) and the front absorptive polarizer (e), the reflective polarizing element reflecting a portion of dark state light back toward the backlight unit, wherein the backlight unit comprises at least one light source for which the light output can be controlled as a function of the number of dark pixels in the displayed image.

2. The method according to claim 1 wherein the light source is a light emitting diode and the brightness is controlled by the step of varying the drive current to a light emitting diode.

* * * * *